(12) United States Patent
Kishigami et al.

(10) Patent No.: US 10,254,551 B2
(45) Date of Patent: Apr. 9, 2019

(54) VIRTUAL IMAGE DISPLAY DEVICE

(71) Applicant: MITSUBISHI ELECTRIC CORPORATION, Tokyo (JP)

(72) Inventors: Tomo Kishigami, Tokyo (JP); Hironori Nakahara, Tokyo (JP); Nozomi Nakagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 49 days.

(21) Appl. No.: 15/310,399

(22) PCT Filed: Mar. 26, 2015

(86) PCT No.: PCT/JP2015/059302
§ 371 (c)(1),
(2) Date: Nov. 10, 2016

(87) PCT Pub. No.: WO2015/190157
PCT Pub. Date: Dec. 17, 2015

(65) Prior Publication Data
US 2017/0146803 A1    May 25, 2017

(30) Foreign Application Priority Data
Jun. 13, 2014    (JP) .................................. 2014-121944

(51) Int. Cl.
*G02B 27/01* (2006.01)
*G02B 5/30* (2006.01)
(Continued)

(52) U.S. Cl.
CPC .......... *G02B 27/0179* (2013.01); *B60K 35/00* (2013.01); *G02B 5/30* (2013.01);
(Continued)

(58) Field of Classification Search
CPC ............ G02B 27/0179; G02B 27/0101; G02B 27/0149; G02B 5/3083; G02B 27/283;
(Continued)

(56) References Cited

U.S. PATENT DOCUMENTS 7,072,020 B1 * 7/2006 Sutherland .......... G02F 1/13342
349/201
8,792,177 B2 * 7/2014 Nakamura ......... G02B 27/0101
359/630
(Continued)

FOREIGN PATENT DOCUMENTS

JP    2004-168230 A    6/2004
JP    2007-524117 A    8/2007
(Continued)

OTHER PUBLICATIONS

Office Action dated May 31, 2018 in corresponding Chinese Patent Application No. 201580031269.9.

*Primary Examiner* — Sathyanaraya V Perungavoor
*Assistant Examiner* — Howard D Brown, Jr.
(74) *Attorney, Agent, or Firm* — Birch, Stewart, Kolasch & Birch, LLP

(57) ABSTRACT

A virtual image display device includes a light source unit, a polarization switching unit, an image generation unit, an optical path unit and a projection unit. The polarization switching unit switches a polarization direction of a light beam emitted from the light source unit. The optical path unit includes a first optical path through which the light beam having the first polarization direction travels and a second optical path through which the light beam having the second polarization direction travels. A first virtual image is displayed at a first distance with the light beam that has traveled through the first optical path. A second virtual image is displayed at a second distance farther than the first
(Continued)

distance with the light beam that has traveled through the second optical path.

14 Claims, 14 Drawing Sheets

(51) Int. Cl.
    *B60K 35/00*     (2006.01)
    *G02B 27/28*     (2006.01)
    *H04N 9/31*     (2006.01)

(52) U.S. Cl.
    CPC ....... *G02B 5/3083* (2013.01); *G02B 27/0101* (2013.01); *G02B 27/0149* (2013.01); *G02B 27/283* (2013.01); *H04N 9/3135* (2013.01); *H04N 9/3155* (2013.01); *H04N 9/3161* (2013.01); *H04N 9/3167* (2013.01); *B60K 2350/1072* (2013.01); *B60K 2350/203* (2013.01); *B60K 2350/2052* (2013.01); *B60K 2350/352* (2013.01); *G02B 2027/0141* (2013.01); *G02B 2027/0163* (2013.01); *G02B 2027/0185* (2013.01)

(58) Field of Classification Search
    CPC .... G02B 2027/0185; G02B 2027/0163; B60K 35/00; B60K 2350/352; B60K 2350/203; B60K 2350/1072; B60K 2350/2052; H04N 9/3167; H04N 9/3161; H04N 9/3155; H04N 9/3135
    See application file for complete search history.

(56) References Cited

U.S. PATENT DOCUMENTS

| | | | | |
|---|---|---|---|---|
| 2007/0139760 A1* | 6/2007 | Baker | ................ | G02B 27/0068 359/320 |
| 2009/0009594 A1* | 1/2009 | Kawai | ................ | G02B 27/2278 348/54 |
| 2009/0021824 A1* | 1/2009 | Ijzerman | ............ | G02B 27/2278 359/303 |
| 2009/0160736 A1* | 6/2009 | Shikita | ............... | G02B 27/0101 345/7 |
| 2012/0032874 A1 | 2/2012 | Mukawa | | |
| 2013/0050593 A1* | 2/2013 | Fujikawa | ........... | G02B 27/0101 349/9 |
| 2013/0265623 A1 | 10/2013 | Sugiyama et al. | | |
| 2013/0265646 A1* | 10/2013 | Sakai | .................... | G02B 27/01 359/631 |
| 2015/0092118 A1* | 4/2015 | Hada | ...................... | B60K 35/00 349/11 |

FOREIGN PATENT DOCUMENTS

| | | |
|---|---|---|
| JP | 2007-529028 A | 10/2007 |
| JP | 2008-257021 A | 10/2008 |
| JP | 2009-15128 A | 1/2009 |
| JP | 2009-150947 A | 7/2009 |
| JP | 2009-248847 A | 10/2009 |
| JP | 2009-280142 A | 12/2009 |
| JP | 2009-288388 A | 12/2009 |
| JP | 2010-107545 A | 5/2010 |
| JP | 2012-37761 A | 2/2012 |
| JP | 2012-58689 A | 3/2012 |
| JP | 2013-83675 A | 5/2013 |
| JP | 2013-190957 A | 9/2013 |
| JP | 2013-214008 A | 10/2013 |
| JP | 2013-235256 A | 11/2013 |
| WO | WO 2014/208330 A1 | 12/2014 |

* cited by examiner

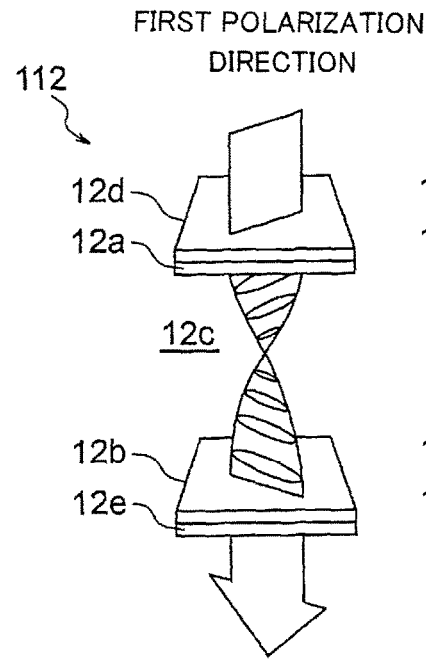
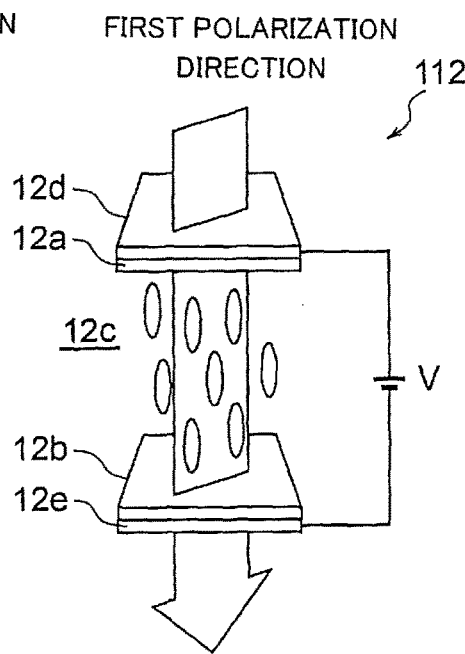
FIG. 4(A)　　　FIG. 4(B)
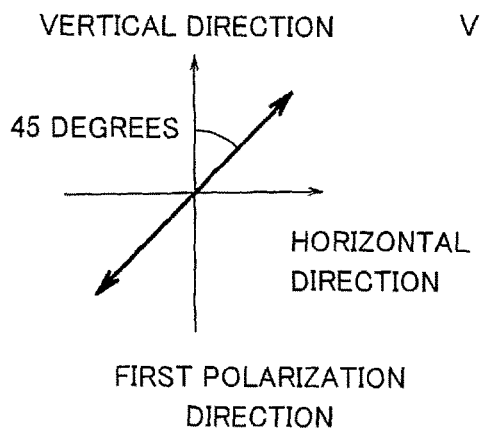
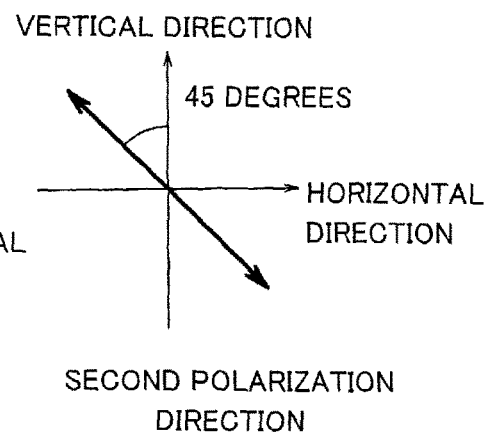
FIG. 5(A)　　　FIG. 5(B)

ENERGIZATION OF
POLARIZATION
SWITCHING ELEMENT

DISPLAYED IMAGE

VIRTUAL IMAGE DISPLAY DEVICE

TECHNICAL FIELD

The present invention relates to a virtual image display device mainly used as a head-up display of an automobile or the like.

BACKGROUND ART

A head-up display (hereinafter referred to as a "HUD") for a vehicle displays driving support information as a virtual image in front of a windshield as viewed from the driver. The driving support information includes, for example, a speed indication, navigation information and so on. The driver can visually recognize a scene in front of the vehicle and the driving support information in a superimposed state. This allows the driver to shorten the time for moving his/her line of vision or the time for focal adjustment, in the driving of the vehicle. Accordingly, the HUD is capable of lessening fatigue of the driver and improving safety.

To further shorten the time for the focal adjustment in driving, a virtual image display distance needs to be brought closer to a focal distance of the driver's eyes. The virtual image display distance is a distance from the driver to the virtual image. The focal distance of the driver's eyes is a distance from the driver to a position the driver is watching. However, the position the driver is watching changes according to traveling speed and so on. Thus, there has been proposed a technology that changes the virtual image display distance according to the vehicle's traveling speed and so on (see Patent Reference 1, for example).

In the technology disclosed in the Patent Reference 1, a scan means for scanning a light beam from a light source, a screen on which the light beam scanned by the scan means forms an image and a projection means for projecting the image formed on the screen are provided, and the virtual image display distance is changed by moving the screen.

PRIOR ART REFERENCE

Patent Reference

Patent Reference 1: Japanese Patent Application Publication No. 2009-15094 (Paragraphs 0023-0047, FIGS. 1 and 2)

SUMMARY OF THE INVENTION

Problem to be Solved by the Invention

However, in the technology disclosed in the Patent Reference 1, it is necessary to make a moving distance of the screen long in order to greatly change the virtual image display distance. Further, a drive unit for moving the screen is necessary. Thus, the device increases in size. Furthermore, a long time is necessary for changing the virtual image display distance.

The object of the present invention is to provide a virtual image display device that has a configuration allowing for downsizing and is capable of shortening the time for changing a virtual image display distance.

Means for Solving the Problem

A virtual image display device according to the present invention includes: a light source unit that emits a light beam; a polarization switching unit provided on an optical path of the light beam emitted from the light source unit, the polarization switching unit switching a polarization direction of the light beam emitted from the light source unit between an unchanged first polarization direction and a changed second polarization direction; an image generation unit that generates an image by using the light beam emitted from the light source unit; an optical path unit arranged at a position where the light beam emerging from the image generation unit is incident, the optical path unit including a first optical path through which the light beam having the first polarization direction travels and a second optical path through which the light beam having the second polarization direction travels, optical path length of the second optical path being longer than optical path length of the first optical path; and a projection unit that projects the light beam emerging from the optical path unit. A virtual image based on the image is displayed at a first distance from an observer with the light beam that has traveled through the first optical path of the optical path unit. A virtual image based on the image is displayed at a second distance farther than the first distance from the observer with the light beam that has traveled through the second optical path of the optical path unit.

Effects of the Invention

According to the present invention, downsizing of the virtual image display device becomes possible and the time for changing the virtual image display distance can be shortened.

BRIEF DESCRIPTION OF THE DRAWINGS

FIGS. 4(A) and 4(B) are schematic diagrams for explaining operation principles of a polarization switching unit in the virtual image display device of the first embodiment.

FIGS. 5(A) and 5(B) are schematic diagrams for explaining polarization directions of a light beam in the virtual image display device of the first embodiment.

MODE FOR CARRYING OUT THE INVENTION

First Embodiment

<Overall Configuration of Virtual Image Display Device>

Figure 1A:
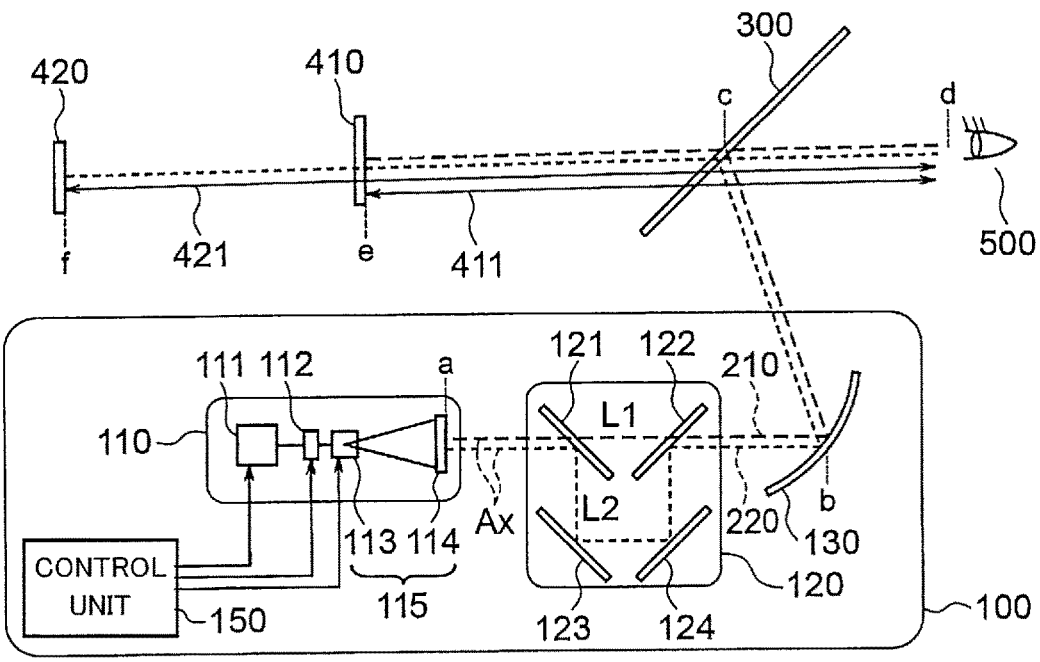
FIGS. 1(A) and 1(B) are a diagram showing a configuration of a virtual image display device of a first embodiment of the present invention and a diagram showing respective distances in optical paths in the virtual image display device.
Figure 1B:
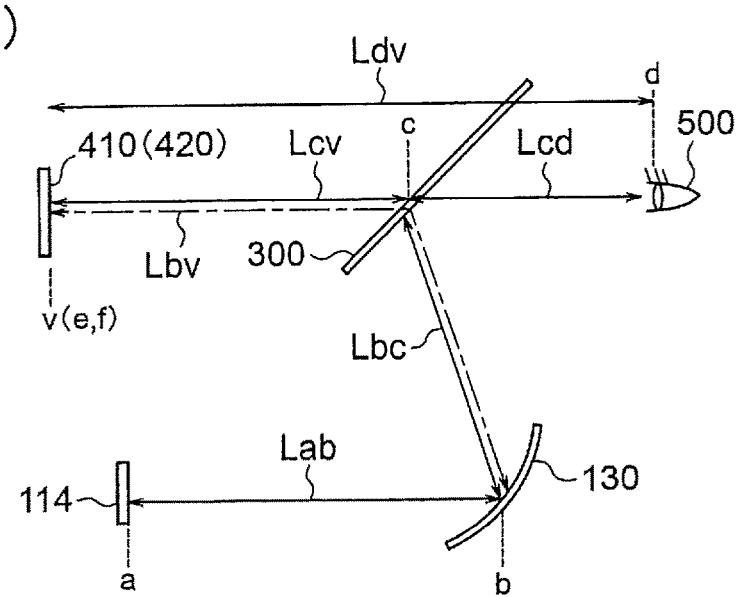

FIG. 1(A) is a diagram showing a configuration of a virtual image display device 100 according to a first embodiment. FIG. 1(B) is a schematic diagram for explaining distances in optical paths in the virtual image display device 100. The virtual image display device 100 shown in FIG. 1(A) and FIG. 1(B) is used as, for example, a head-up display installed in a dashboard 610 of a vehicle 600 (see FIG. 8).

In the following, in the state in which the virtual image display device 100 has been installed in the vehicle 600, the gravity direction will be referred to as a "vertical direction" and a direction orthogonal to the vertical direction will be referred to as a "horizontal direction" for convenience of explanation.

As shown in FIG. 1(A), the virtual image display device 100 includes a light source unit 111, a polarization switching unit 112, an image generation unit 115 and an optical path unit 120. In the following description, the polarization switching unit 112 will be described as a polarization switching element.

The image generation unit 115 will be described as a configuration including a scan unit 113 and a screen 114, for example. Further, a configuration including the light source unit 111, the polarization switching element 112, the scan unit 113 and the screen 114 will be referred to as an image display unit 110.

The image display unit 110 displays an image. The light source unit 111 emits a light beam (here, a laser beam). The polarization switching element 112 controls a polarization direction of the light beam emitted from the light source unit 111. The scan unit 113 scans the light beam emerging from the polarization switching element 112 on the screen 114. As mentioned above, the scan unit 113 and the screen 114 form the image generation unit 115.

The optical path unit 120 includes two optical paths through which the light beam (image light) emerging from the image display unit 110 travels. The optical path unit 120 will be described as a configuration including a first polarizing mirror 121, a second polarizing mirror 122, a first reflecting mirror 123 and a second reflecting mirror 124, for example.

The virtual image display device 100 may be equipped with a magnifying mirror 130 and a control unit 150.

The magnifying mirror 130 as a projection unit magnifies and projects the light beam emerging from the optical path unit 120. The control unit 150 controls the light source unit 111, the polarization switching element 112 and the scan unit 113.

<Configuration of Light Source Unit>

Figure 2:
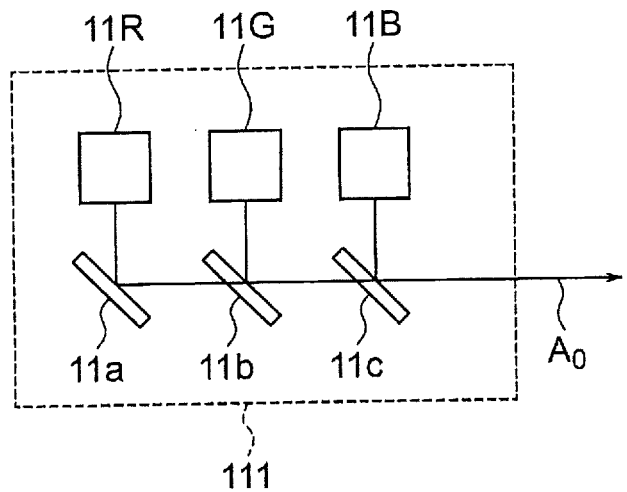
FIG. 2 is a schematic diagram for explaining an example of a configuration of a light source unit in the virtual image display device of the first embodiment.

FIG. 2 is a schematic diagram showing an example of a configuration of the light source unit 111. The light source unit 111 includes semiconductor lasers 11R, 11G and 11B that respectively emit laser beams having wavelengths of red, green and blue, for example. The light source unit 111 emits the laser beams emitted from these semiconductor lasers 11R, 11G and 11B as a bundle of light beams on a common optical axis $A_0$.

In the configuration example shown in FIG. 2, the semiconductor lasers 11R, 11G and 11B are arranged side by side in one direction. Specifically, in FIG. 2, the semiconductor lasers 11R, 11G and 11B are arranged side by side in a direction parallel to the optical axis $A_0$.

Mirrors 11a, 11b and 11c (combining means) are arranged respectively on the emitting sides of the semiconductor lasers 11R, 11G and 11B.

The mirror 11a is a reflecting mirror that reflects the red laser beam emitted from the semiconductor laser 11R by an angle of 90 degrees. In the first embodiment, the mirror 11a is a total reflection mirror, for example.

The mirror 11b reflects the green laser beam emitted from the semiconductor laser 11G by an angle of 90 degrees. Meanwhile, the mirror 11b transmits the red laser beam reflected by the mirror 11a. Here, a mirror that transmits light of certain wavelengths and reflects light of the other wavelengths is referred to as a "selective transmission/reflection mirror". Thus, the mirror 11b is the selective transmission/reflection mirror that reflects the green laser beam and transmits the red laser beam.

The mirror 11c reflects the blue laser beam emitted from the semiconductor laser 11B by an angle of 90 degrees. Meanwhile, the mirror 11c transmits the red laser beam that has been transmitted through the mirror 11b and the green laser beam reflected by the mirror 11b. Thus, the mirror 11c is the selective transmission/reflection mirror that reflects the blue laser beam and transmits the red and green laser beams.

Accordingly, the laser beams of the wavelengths of red, green and blue are combined together and emitted as the bundle of light beams on the common optical axis $A_0$.

Incidentally, the configuration of the light source unit 111 is not limited to the configuration example shown in FIG. 2. For example, a configuration that combines laser beams of respective colors together by use of a dichroic prism or the like and emits the combined laser beam may also be employed.

In general, in polarization properties of the semiconductor laser used for the light source unit 111, there are a TE (Transverse Electric) mode and a TM (Transverse Magnetic) mode. In cases of the TE mode, linearly polarized light having a polarization direction parallel to a bonding surface of the semiconductor laser is obtained. In cases of the TM mode, linearly polarized light having a polarization direction orthogonal to the bonding surface of the semiconductor laser is obtained. Incidentally, a direction of the bonding surface of the semiconductor laser can be judged from a shape of a package of the semiconductor laser. The mode (TE mode/TM mode) of the polarization property of the semiconductor laser is determined according to specifications of the semiconductor laser.

<Configuration of Polarization Switching Element>

Returning to FIG. 1(A), the light beam emitted from the light source unit 111 enters the polarization switching element 112. The polarization switching element 112 changes the polarization direction of the incoming light beam according to voltage applied thereto. Specifically, the polarization switching element 112 can rotate the polarization direction of the incoming light beam by 90 degrees according to the applied voltage and emit the light beam after the rotation. Moreover, the polarization switching element 112 can emit the light beam without changing the polarization direction according to the applied voltage.

FIGS. 4(A) and 4(B) are schematic diagrams for explaining a basic configuration of the polarization switching element 112. The polarization switching element 112 can be formed with a liquid crystal element, for example.

Specifically, the polarization switching element 112 is made by providing a liquid crystal layer 12c made of liquid crystal molecules between two alignment layers 12a and 12b the groove directions of which differ from each other by 90 degrees. Transparent electrodes 12d and 12e for applying voltage to the liquid crystal layer 12c are provided on both sides of a pair of the alignment layers 12a and 12b.

As shown in FIG. 4(A), in a state where no voltage is applied to the liquid crystal layer 12c, the liquid crystal molecules are arranged side by side along the directions of the grooves of the alignment layer 12a, 12b. Thus, the polarization direction of the light beam entering the liquid crystal layer 12c is twisted by 90 degrees in conformity with a twist of the liquid crystal molecules. That is, the incoming light beam exits after its polarization direction has been rotated by 90 degrees. In FIG. 4(A), if the polarization direction of the incoming light beam is a first polarization direction, the polarization direction of the outgoing light beam is a second polarization direction, for example.

In contrast, when the voltage (V) is applied to the liquid crystal layer 12c as shown in FIG. 4(B), the liquid crystal molecules are arranged side by side along a direction of an electric field. Thus, the polarization direction of the light beam entering the liquid crystal layer 12c does not change. The incoming light beam exits with its polarization direction unchanged. In FIG. 4(B), if the polarization direction of the incoming light beam is a first polarization direction, for example, the polarization direction of the outgoing light beam is the first polarization direction.

FIGS. 5(A) and 5(B) are schematic diagrams for explaining the polarization directions of the light beams used in the first embodiment. FIGS. 5(A) and 5(B) are diagrams showing the polarization directions when an incidence surface of the polarization switching element 112 is viewed from a light source unit 111's side.

The light source unit 111 is arranged so that the polarization direction of the light beam (laser beam) emitted from the light source unit 111 becomes the first polarization direction at the incidence surface of the polarization switching element 112 (FIG. 5(A)). When the incidence surface of the polarization switching element 112 is viewed from the light source unit 111's side, the first polarization direction is a direction rotated clockwise from the vertical direction by 45 degrees.

The polarization switching element 112 is arranged so that the groove direction of the alignment layer 12a on its incidence side becomes the direction for transmitting the light beam of the first polarization direction emitted from the light source unit 111.

When the voltage is applied to the polarization switching element 112, the polarization direction does not change as shown in FIG. 4(B). Thus, a light beam having the first polarization direction (FIG. 5(A)) exits from the polarization switching element 112.

When no voltage is applied to the polarization switching element 112, the polarization direction changes by 90 degrees as shown in FIG. 4(A). Thus, a light beam having the second polarization direction (FIG. 5(B)) exits from the polarization switching element 112.

<Configuration of Scan Unit>

The scan unit 113 is formed with a MEMS (Micro Electro Mechanical Systems) mirror or a galvanometer mirror, for example. The light beam that has been transmitted through the polarization switching element 112 enters the scan unit 113. The scan unit 113 scans the incoming light beam two-dimensionally on the screen 114 and thereby generates the image. Incidentally, the light beam for generating the image (the light beam scanned on the screen 114) will be referred to as image light.

Figure 3:
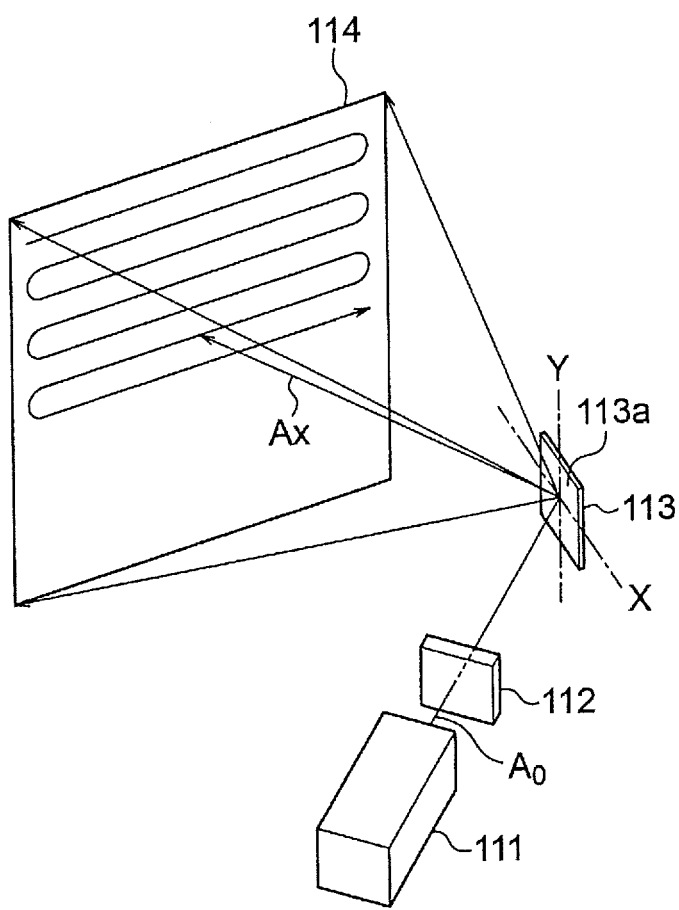
FIG. 3 is a schematic diagram for explaining an example of a configuration of a scan unit in the virtual image display device of the first embodiment.

FIG. 3 is a schematic diagram showing a basic configuration in a case where the scan unit 113 is formed with a MEMS mirror. In the scan unit 113 (MEMS mirror), a scan mirror 113a having a reflecting surface is arranged to be rotatable around two axes as central axes (rotation axes). The two axes are, for example, a rotation axis in the horizontal direction (X-axis) and a rotation axis in the vertical direction (Y-axis).

The light beam is scanned in the horizontal direction by rotating the scan mirror 113a around the rotation axis in the vertical direction (Y-axis). Further, the light beam is scanned in the vertical direction by rotating the scan mirror 113a around the rotation axis in the horizontal direction (X-axis). With these operations, the scan unit 113 performs a raster scan in biaxial directions. The "raster scan" is a method of displaying an image by drawing a horizontal scan line on a screen of a display and successively shifting the scan in the vertical direction.

The control unit 150 sends a laser drive signal to the light source unit 111 on the basis of image signal data to be displayed. Further, the control unit 150 sends a MEMS drive signal in sync with the laser drive signal to the scan unit 113.

The screen 114 is a transmission type screen. The light beam is scanned two-dimensionally on a surface of the screen 114, and thereby the image is displayed. A size of the screen 114 is 6 inches (diagonal dimension), for example.

Incidentally, the screen 114 is not limited to the transmission type; the screen 114 can also be the reflective type. Further, the image signal data may be generated either by the control unit 150 itself or by another device such as a control unit of the vehicle or a navigation system.

A state in which the scan mirror 113a is at a central position in a rotational direction around the rotation axis in the horizontal direction and at a central position in a rotational direction around the rotation axis in the vertical direction is defined as a reference position of the scan mirror 113a. In the state in which the scan mirror 113a is at the reference position (central position), the path of the central ray of the light beam emerging from the scan mirror 113a is defined as a reference optical axis Ax. The reference optical axis Ax passes through the central position of the screen 114 in the horizontal direction and in the vertical direction.

<Configuration of Optical Path Unit>

Returning to FIG. 1(A), the light beam that has been transmitted through the screen 114 enters the optical path unit 120. The light beam that has been transmitted through the screen 114 is the image light.

The optical path unit 120 includes a first optical path 210 and a second optical path 220 corresponding to the polarization directions of the incoming light beam. The polarization direction of the incoming light beam has been controlled by the polarization switching element 112. The first optical path 210 and the second optical path 220 differ from each other in optical path length. Namely, the optical path length of the first optical path 210 differs from the optical path length of the second optical path 220.

The optical path unit 120 outputs the light beam which has traveled through the first optical path 210 or the second optical path 220 towards the magnifying mirror 130. A configuration of the optical path unit 120 will be described later.

<Configuration of Magnifying Mirror>

The magnifying mirror 130 has a reflecting surface having negative power (concave surface), for example. The magnifying mirror 130 projects the image light emerging from the optical path unit 120 towards a windshield 300. Accordingly, a first virtual image 410 or a second virtual image 420 is displayed in a magnified state in front of the windshield 300 as viewed from a driver (observer).

The driver sees the image projected by the magnifying mirror 130 in a state of being superimposed on a scene in front of the windshield 300. Thus, the driver can see an image in which the first virtual image 410 is superimposed on the scene in front of the windshield 300. Alternatively, the driver can see an image in which the second virtual image 420 is superimposed on the scene in front of the windshield 300.

The reflecting surface of the magnifying mirror 130 is formed as a free-form surface in order to correct image distortion caused by the curvature of the windshield 300, for example.

<Display Distance of Virtual Image>

As shown in FIG. 1(B), a distance from a position "a" of the screen 114 to a position "b" of the magnifying mirror 130 is represented as Lab. Further, a distance from a position "b" of the magnifying mirror 130 to a position "v" of the virtual image via the windshield 300 (position "c") is represented as Lbv. In FIG. 1(B), the distance Lbv is indicated by a chain line. The position "v" of the virtual image is a position "e" of the first virtual image 410 or a position "f" of the second virtual image 420.

A focal distance of the magnifying mirror 130 is represented as F. In this case, according to a lens imaging formula, the following expression (1) holds:

$$1/Lab - 1/Lbv = 1/F \quad (1)$$

By expanding the expression (1), the following expression (2) is obtained:

$$Lbv = 1/(1/Lab - 1/F) \quad (2)$$

A distance from the position "b" of the magnifying mirror 130 to the position "c" of the windshield 300 is represented as Lbc. A distance from the position "c" of the windshield 300 to a position "d" of the driver's eyes 500 is represented as Lcd. A distance from the position "d" of the driver's eyes 500 to the position "v" of the virtual image (i.e., the position "e" of the first virtual image 410 or the position "f" of the second virtual image 420) is represented as Ldv.

A distance Lcv from the position c of the windshield 300 to the position v of the virtual image can be represented as Ldv−Lcd, and also as Lbv−Lbc. Thus, the following expression (3) holds:

$$Ldv - Lcd = Lbv - Lbc \quad (3)$$

By rearranging the above expression (3) as $$Ldv = Lbv - Lbc + Lcd$$

and substituting the aforementioned expression (2) into this expression, the following expression (4) is obtained:

$$Ldv = 1/(1/Lab - 1/F) - Lbc + Lcd \quad (4)$$

For example, the distance Lbc is assumed to be 250 mm. The distance Lbc is the distance from the position "b" of the magnifying mirror 130 to the position "c" of the windshield 300. The distance Lcd is assumed to be 850 mm. The distance Lcd is the distance from the position "c" of the windshield 300 to the position "d" of the driver's eyes 500. The focal distance F of the magnifying mirror 130 is assumed to be 600 mm.

Figure 6:
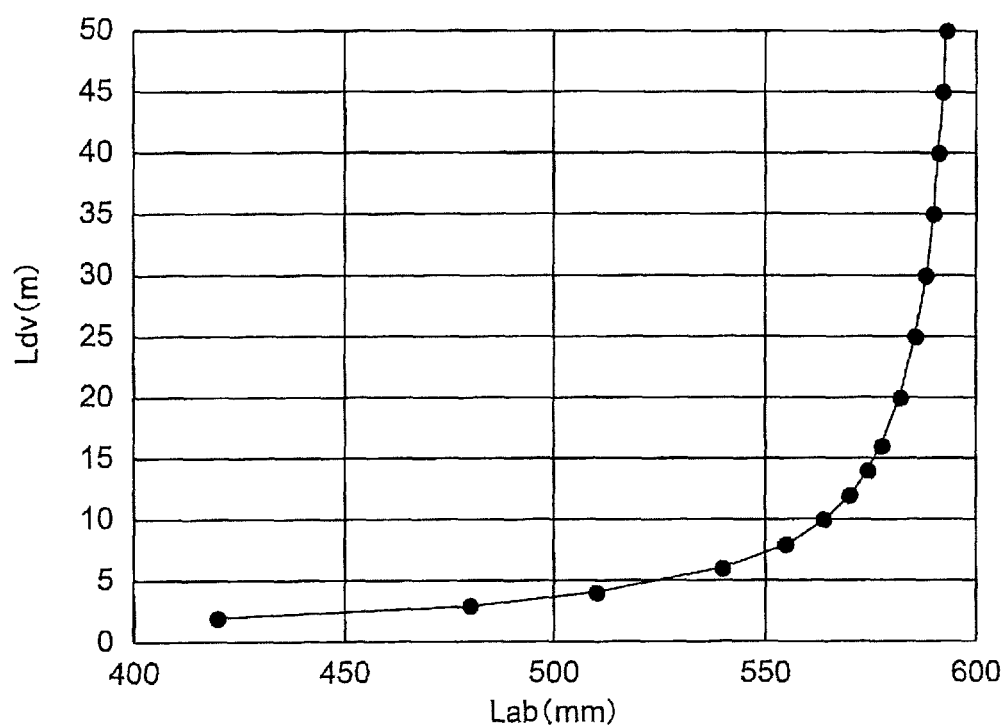
FIG. 6 is a diagram showing a relationship between a distance from a screen to a magnifying mirror and a distance from eyes of a driver to a virtual image in the virtual image display device of the first embodiment.

In a case of these conditions, a relationship between the distance Lab and the distance Ldv is expressed as the graph shown in FIG. 6. The distance Lab is the distance from the position "a" of the screen 114 to the position "b" of the magnifying mirror 130. The distance Ldv is the distance from the position "d" of the driver's eyes 500 to the virtual image.

FIG. 6 is a diagram showing the relationship between the distance Lab from the screen 114 to the magnifying mirror 130 and the distance Ldv from the driver's eyes 500 to the virtual image in the virtual image display device. The horizontal axis represents the distance Lab (mm). In FIG. 6, the value of the distance Lab is smaller on the left-hand side. The vertical axis represents the distance Ldv (m). In FIG. 6, the value of the distance Ldv is smaller on the lower side.

As shown in FIG. 6, the distance Ldv increases as the distance Lab approaches the focal distance F (600 mm). Further, as the distance Lab approaches the focal distance F (600 mm), the ratio of the change in the distance Ldv to the change in the distance Lab increases sharply. The distance Lab is the distance from the position "a" of the screen 114 to the position "b" of the magnifying mirror 130. The distance Ldv is the distance from the position "d" of the driver's eyes 500 to the virtual image.

In general, when the driver is driving the vehicle at normal speed in an urban area or the like, it is considered that the driver is watching a position relatively close from the driver's eyes 500 (position approximately 4-10 m ahead). Here, the normal speed means approximately 50-60 km/hour, for example. In cases where a position where the virtual image is displayed at times of normal driving is set at, for example, 2 m which is shorter than the distance to the position the driver is watching, by setting the distance Ldv at 2 m in the graph of FIG. 6, a distance Lab becomes approximately 420 mm. The distance Ldv is the distance from the position "d" of the driver's eyes 500 to the virtual image. The distance Lab is the distance from the position "a" of the screen 114 to the position "b" of the magnifying mirror 130.

In contrast, when the driver is driving the vehicle at high speed on an expressway or the like, it is considered that the driver is watching a position far from the driver's eyes 500 (position approximately 30-50 m ahead). Here, the high speed means 80 km/hour or higher, for example. In cases where the position where the virtual image is displayed at times of high-speed driving is set at, for example, 20 m which is shorter than the distance to the position the driver is watching, by setting the distance Ldv at 20 m in FIG. 6, a distance Lab becomes approximately 582 mm. The distance Ldv is the distance from the position "d" of the driver's eyes 500 to the virtual image. The distance Lab is the distance from the position "a" of the screen 114 to the position "b" of the magnifying mirror 130.

Thus, in the first embodiment, the distance Lab is switched according to driving status (e.g., traveling speed of the vehicle). Accordingly, a distance from the observer to the position where the virtual image is displayed (referred to as a display distance) is switched between a first distance 411 and a second distance 421 shown in FIG. 1(A). The distance Lab is the distance from the position "a" of the screen 114 to the position "b" of the magnifying mirror 130.

Figure 8:
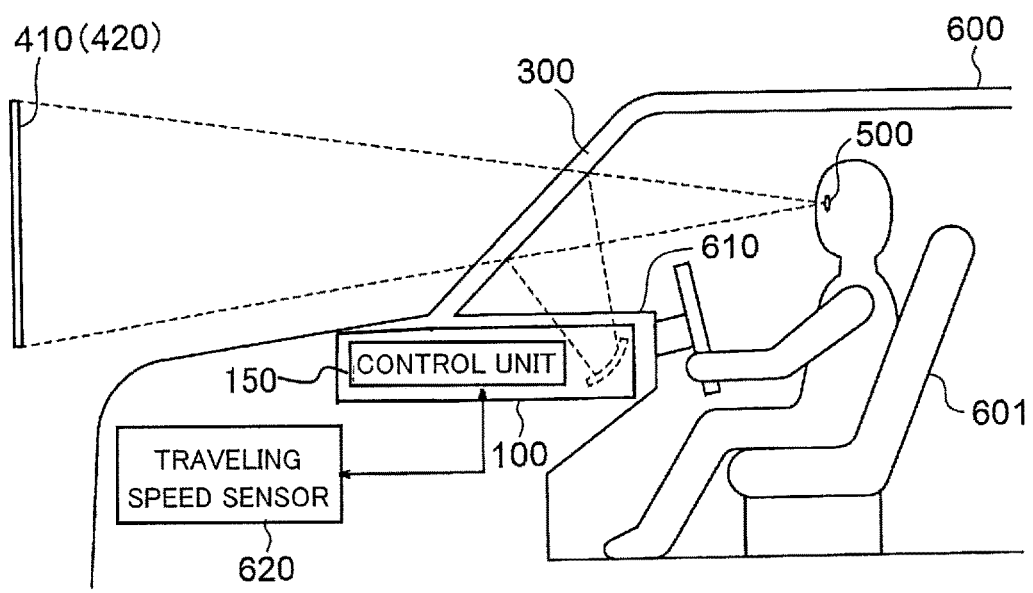
FIG. 8 is a schematic diagram for explaining an example of switching control of a virtual image display distance in the virtual image display device of the first embodiment.

Incidentally, the distance Lcd is mostly determined by specifications such as the arrangement of a seat 601 (see FIG. 8). The distance Lbc is mostly determined by specifications such as a positional relationship between the dashboard 610 (see FIG. 8) and the windshield 300. In the specifications of general vehicles, the distances Lbc, Lcd, Ldv, and so on roughly become the aforementioned values. The distance Lcd is the distance from the position "c" of the windshield 300 to the position "d" of the driver's eyes 500. The distance Lbc is the distance from the position "b" of the magnifying mirror 130 to the position "c" of the windshield 300.

A magnification ratio M of the magnifying mirror 130 is expressed as Lbv/Lab. A size of the virtual image is the product of the size of the screen 114 and the magnification ratio M.

In a case where the dimension of the screen 114 is 6 inches, for example, the size (diagonal dimension) of the image (virtual image) displayed at the position "e" at the distance 2 m (first distance 411) is 20 inches, for example. The size of the image (virtual image) displayed at the position "f" at the distance 20 m (second distance 421) is 200 inches, for example. In either case, the apparent size of the image (virtual image) viewed by the driver is 10 inches, for example. Incidentally, a size of an image surface is represented by a numerical value of the length of the diagonal line in units of inches. The numerical value is referred to as an inch number. Here, the size of the virtual image is represented by the inch number.

Here, the focal distance F of the magnifying mirror 130 is assumed to be 60 mm. However, if the focal distance F of the magnifying mirror 130 changes, the relationship between the distance Lab and the distance Ldv also changes. The distance Lab is the distance from the position "a" of the screen 114 to the position "b" of the magnifying mirror 130. The distance Ldv is the distance from the position "d" of the driver's eyes 500 to the position "v" of the virtual image.

Specifically, as the focal distance F of the magnifying mirror 130 decreases, the curve shown in FIG. 6 shifts leftward. In other words, the curve shifts in a direction of decreasing a value of the distance Lab.

Thus, as the focal distance F is set to be shorter, the distance Ldv can be set to be longer even if the distance Lab is set to be shorter. The distance Lab is the distance from the position "a" of the screen 114 to the position "b" of the magnifying mirror 130. The distance Ldv is the distance from the position "d" of the driver's eyes 500 to the virtual image.

<Configuration of Optical Path Unit>

Next, a concrete configuration of the optical path unit 120 for switching the distance Lab will be described. The distance Lab is the distance from the position "a" of the screen 114 to the position "b" of the magnifying mirror 130.

As shown in FIG. 1(A), the optical path unit 120 includes the first polarizing mirror 121, the second polarizing mirror 122, the first reflecting mirror 123 and the second reflecting mirror 124, for example.

The first polarizing mirror 121 (first polarized beam splitter) is arranged at a position where the light beam (image light) that has been transmitted through the screen 114 is incident. Namely, the light beam (image light) that has been transmitted through the screen 114 is incident upon the first polarizing mirror 121 (first polarized beam splitter). More specifically, a central position (central position in the horizontal direction and in the vertical direction) of the first polarizing mirror 121 is on the aforementioned reference optical axis Ax.

The first polarizing mirror 121 is a polarized beam splitter that reflects or transmits the incoming light beam according to its polarization direction. Here, the first polarizing mirror 121 transmits a light beam having the second polarization direction shown in FIG. 5(B). Meanwhile, the first polarizing mirror 121 reflects a light beam having the first polarization direction shown in FIG. 5(A).

In FIG. 1(A), the first polarizing mirror 121 reflects the light beam having the first polarization direction downward by an angle of 90 degrees, for example. Here, the "angle" means an angle obtained by summing an incidence angle and a reflection angle of the light beam.

Incidentally, the first polarizing mirror 121 is not limited to such a configuration; the first polarizing mirror 121 may be configured to transmit the light beam having the first polarization direction shown in FIG. 5(A) and reflect the light beam having the second polarization direction shown in FIG. 5(B).

The second polarizing mirror 122 (second polarized beam splitter) is arranged at a position where the light beam that has been transmitted through the first polarizing mirror 121 is incident. The second polarizing mirror 122 (second polarized beam splitter) is arranged at a position at a distance L1 from the first polarizing mirror 121.

More specifically, a central position of the second polarizing mirror 122 in the horizontal direction and in the vertical direction is on the aforementioned reference optical axis Ax of the scan mirror 113a. A length of the reference optical axis Ax from the first polarizing mirror 121 to the second polarizing mirror 122 is the distance L1.

Like the first polarizing mirror 121, the second polarizing mirror 122 is the polarized beam splitter that reflects or transmits the incoming light beam according to its polarization direction. Here, the second polarizing mirror 122 transmits a light beam having the second polarization direction. Namely, the second polarizing mirror 122 transmits the light beam that has been transmitted through the first polarizing mirror 121. Meanwhile, the second polarizing mirror 122 reflects a light beam having the first polarization direction by the reflection angle of 90 degrees. Namely, the second polarizing mirror 122 reflects the light beam successively reflected by the first polarizing mirror 121, the first reflecting mirror 123 and the second reflecting mirror 124 by the reflection angle of 90 degrees.

The first reflecting mirror 123 is arranged at a position where the light beam reflected by the first polarizing mirror 121 is incident. The first reflecting mirror 123 is arranged at a position at a distance L2 from the first polarizing mirror 121.

More specifically, a central position (central position in the horizontal direction and in the vertical direction) of the first reflecting mirror 123 is on an axis that passes through the central position of the first polarizing mirror 121 and is orthogonal to the reference optical axis Ax. A length of the axis orthogonal to the reference optical axis Ax from the first polarizing mirror 121 to the first reflecting mirror 123 is the distance L2.

The first reflecting mirror 123 is a total reflection mirror reflecting the incoming light beam by an angle of 90 degrees, for example. Here, a traveling direction of the light beam reflected by the first reflecting mirror 123 is parallel with the traveling direction of the light beam that has been transmitted through the first polarizing mirror 121.

The second reflecting mirror 124 is arranged at a position where the light beam reflected by the first reflecting mirror 123 is incident. Namely, the light beam reflected by the first reflecting mirror 123 is incident upon the second reflecting mirror 124. More specifically, a central position (central position in the horizontal direction and in the vertical direction) of the second reflecting mirror 124 is on an axis that passes through the central position of the first reflecting mirror 123 and is parallel to the reference optical axis Ax.

A distance from the first reflecting mirror 123 to the second reflecting mirror 124 is equal to the distance L1 from the first polarizing mirror 121 to the second polarizing mirror 122. Thus, a length of the axis parallel to the reference optical axis Ax from the first reflecting mirror 123 to the second reflecting mirror 124 is the distance L1.

Like the first reflecting mirror 123, the second reflecting mirror 124 is a total reflection mirror reflecting the incoming light beam by an angle of 90 degrees, for example.

The second reflecting mirror 124 is arranged so that the light beam reflected by the second reflecting mirror 124 is incident upon the second polarizing mirror 122. Namely, the light beam reflected by the second reflecting mirror 124 is incident upon the second polarizing mirror 122. More specifically, the central position (central position in the horizontal direction and in the vertical direction) of the second reflecting mirror 124 is on an axis that passes through the central position of the second polarizing mirror 122 and is orthogonal to the reference optical axis Ax.

A distance from the second reflecting mirror 124 to the second polarizing mirror 122 is equal to the distance L2 from the first polarizing mirror 121 to the first reflecting mirror 123. Thus, the length of the axis orthogonal to the reference optical axis Ax from the second reflecting mirror 124 to the second polarizing mirror 122 is the distance L2.

With this configuration, the light beam having the second polarization direction (FIG. 5(B)) is transmitted through the first polarizing mirror 121, is transmitted through also the second polarizing mirror 122, and is incident upon the magnifying mirror 130. The optical path of the light beam that is transmitted through the first polarizing mirror 121 and the second polarizing mirror 122 as above is defined as the first optical path 210.

In contrast, the light beam having the first polarization direction (FIG. 5(A)) is reflected by the first polarizing mirror 121. The light beam reflected by the first polarizing mirror 121 is further reflected by the first reflecting mirror 123 and the second reflecting mirror 124, and is incident upon the second polarizing mirror 122. Further, the light beam that is reflected by the reflecting mirror 124 and is incident upon the second polarizing mirror 122 is reflected also by the second polarizing mirror 122 and is incident upon the magnifying mirror 130.

The optical path of the light beam successively reflected by the first polarizing mirror 121, the first reflecting mirror 123, the second reflecting mirror 124 and the second polarizing mirror 122 as above is defined as the second optical path 220. The optical path length of the second optical path 220 is longer than that of the first optical path 210 by the distance L2×2.

For example, in cases where the distance Lab is switched between 420 mm and 582 mm as above, the distance L2 is set at approximately 81 mm based on the calculation: distance L2×2=582 mm−420 mm (=162 mm). The distance L1 may be set freely as long as it is within 420 mm. The distance Lab is the distance from the position "a" of the screen 114 to the position "b" of the magnifying mirror 130.

<Operation of Virtual Image Display Device>

Figure 7A:
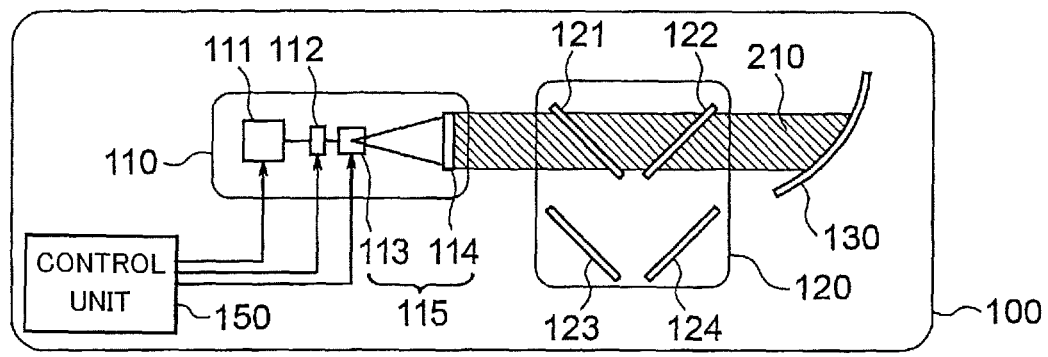
FIGS. 7(A) and 7(B) are schematic diagrams showing an optical path switching operation in the virtual image display device of the first embodiment.
Figure 7B:
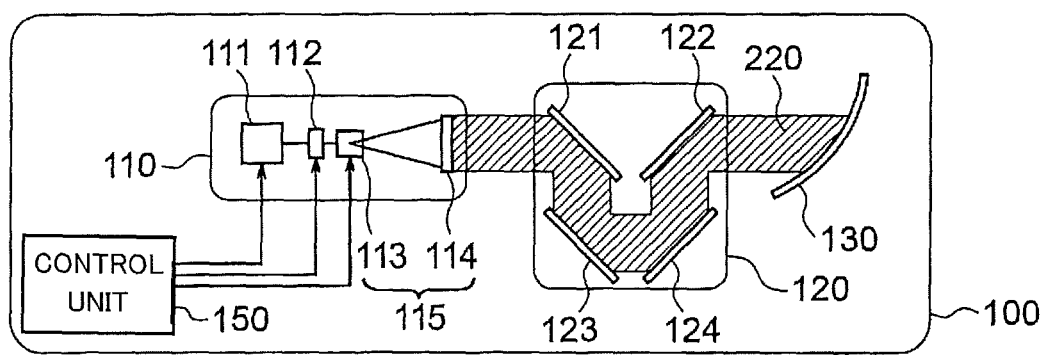

FIG. 7(A) is a diagram showing the optical path from the screen 114 to the magnifying mirror 130 when no voltage is applied to the polarization switching element 112. FIG. 7(B) is a diagram showing the optical path from the screen 114 to the magnifying mirror 130 when the voltage is applied to the polarization switching element 112. In FIGS. 7(A) and 7(B), the bundle of light beams after the screen 114 is indicated by hatching.

When no voltage is applied to the polarization switching element 112, the light beam having the second polarization direction (FIG. 5(B)) emerges from the polarization switching element 112. Then, the light beam having the second polarization direction enters the optical path unit 120. As shown in FIG. 7(A), the light beam having the second polarization direction is transmitted through the first polarizing mirror 121 and then travels in the first optical path 210. Then, the light beam having the second polarization direction is transmitted through the second polarizing mirror 122. The light beam that has been transmitted through the second polarizing mirror 122 is incident upon the magnifying mirror 130.

In contrast, when the voltage is applied to the polarization switching element 112, the light beam having the first polarization direction (FIG. 5(A)) emerges from the polarization switching element 112. Then, the light beam having the first polarization direction enters the optical path unit 120. As shown in FIG. 7(B), the light beam having the first polarization direction is reflected by the first polarizing mirror 121 and then travels in the second optical path 220. Specifically, the light beam having the first polarization direction is successively reflected by the first reflecting mirror 123 and the second reflecting mirror 124 and is incident upon the second polarizing mirror 122. Then, the light beam having the first polarization direction is reflected by the second polarizing mirror 122. The light beam reflected by the second polarizing mirror 122 is incident upon the magnifying mirror 130.

The optical path length of the second optical path 220 is longer than that of the first optical path 210 by the distance L2×2 as mentioned above. Thus, in the case where the voltage is applied to the polarization switching element 112, the distance Lab also increases by the distance L2×2 compared to the case where no voltage is applied. The distance Lab is a travel distance of the light beam from the position "a" of the screen 114 to the position "b" of the magnifying mirror 130.

Therefore, when no voltage is applied to the polarization switching element 112, the image generated on the screen 114 is displayed as the virtual image (first virtual image 410) at the first distance 411 (position "e") close from the driver's eyes 500. In contrast, when the voltage is applied to the polarization switching element 112, the image generated on the screen 114 is displayed as the virtual image (second virtual image 420) at the second distance 421 (position "f") far from the driver's eyes 500.

Incidentally, the first virtual image 410 is formed with light having the polarization property of the first polarization direction (FIG. 5(A)). The second virtual image 420 is formed with light having the polarization property of the second polarization direction (FIG. 5(B)). As shown in FIGS. 5(A) and 5(B), both the first polarization direction and the second polarization direction are inclined with respect to the horizontal direction and the vertical direction. Therefore, even if the driver wears polarized sunglasses, the driver has no problem in visually recognizing the virtual image.

This is because the polarized sunglasses are configured to interrupt light having a polarization direction in the horizontal direction in order to interrupt reflected light of the sunbeam or the like. In the first embodiment, the polarization direction of the light forming the first virtual image 410 (first polarization direction) and the polarization direction of the light forming the second virtual image 420 (second polarization direction) are inclined with respect to the horizontal direction as mentioned above. Thus, even if viewed through the polarized sunglasses, the first virtual image 410 and the second virtual image 420 are visually recognizable, though the amount of light drops by half.

It is common for the first polarizing mirror 121 and the second polarizing mirror 122 to have the properties of transmitting p-polarized light and reflecting s-polarized light.

Thus, in cases where the polarization direction of the incoming light beam to the optical path unit 120 is p-polarization, the incoming light beam to the optical path unit 120 travels through the first optical path 210. In other words, the incoming light beam to the optical path unit 120 is transmitted through the first polarizing mirror 121 and the second polarizing mirror 122. The first optical path 210 is the optical path passing through the first polarizing mirror 121 and the second polarizing mirror 122.

In contrast, in cases where the polarization direction of the incoming light beam to the optical path unit 120 is s-polarization, the incoming light beam to the optical path unit 120 travels through the second optical path 220. In other words, the incoming light beam to the optical path unit 120 is reflected by the first polarizing mirror 121 and the second polarizing mirror 122. The second optical path 220 is the optical path of the light beam successively reflected by the first polarizing mirror 121, the first reflecting mirror 123, the second reflecting mirror 124 and the second polarizing mirror 122.

Accordingly, in cases where the polarization direction of the incoming light beam to the optical path unit 120 is p-polarization, the virtual image 410 is displayed at the position "e". In contrast, in cases where the polarization direction of the incoming light beam to the optical path unit 120 is s-polarization, the virtual image 420 is displayed at the position "f".

<Example of Switching Control of Virtual Image Display Distance>

In the first embodiment, the control unit 150 of the virtual image display device 100 controls the voltage applied to the polarization switching element 112, and thereby switches the position where the virtual image is displayed between the positions "e" and "f".

FIG. 8 is a schematic diagram for explaining an example of switching control of the virtual image display distance performed by the control unit 150 of the virtual image display device 100. In general, the driver watches positions in the vicinity of the vehicle when the traveling speed is low, and watches far positions when the traveling speed is high. Thus, the control unit 150 applies the voltage to the polarization switching element 112 in such a situation where the driver watches far positions. Then, the virtual image display device 100 displays the second virtual image 420 at the second distance 421 (position "f") far from the driver.

Such a situation where the driver watches far positions is a case where the vehicle is traveling on an expressway and suchlike cases, for example. Whether the vehicle 600 is traveling on an expressway or not can be judged on the basis of information on the traveling speed of the vehicle or navigation information, for example. The navigation information is information received from a navigation system 630 (see FIG. 9).

For instance, in the example shown in FIG. 8, the control unit 150 acquires the information on the traveling speed of the vehicle 600 from a traveling speed sensor 620 installed in the vehicle 600.

When the traveling speed of the vehicle 600 is less than a prescribed value (e.g., 80 km/h), the control unit 150 applies no voltage to the polarization switching element 112. Then, the virtual image display device 100 displays the first virtual image 410 at the first distance 411 (position "e") close to the driver.

In contrast, when the traveling speed of the vehicle 600 is higher than or equal to the prescribed value (e.g., 80 km/h), the control unit 150 applies the voltage to the polarization switching element 112. Then, the virtual image display device 100 displays the second virtual image 420 at the second distance 421 (position "f") far from the driver.

Thus, by displaying the virtual image at the second distance 421 (position "f") far from the driver in situations where the driver watches far positions, the time for the focal adjustment of the driver's eyes 500 can be shortened and the visibility can be improved.

Figure 9A:
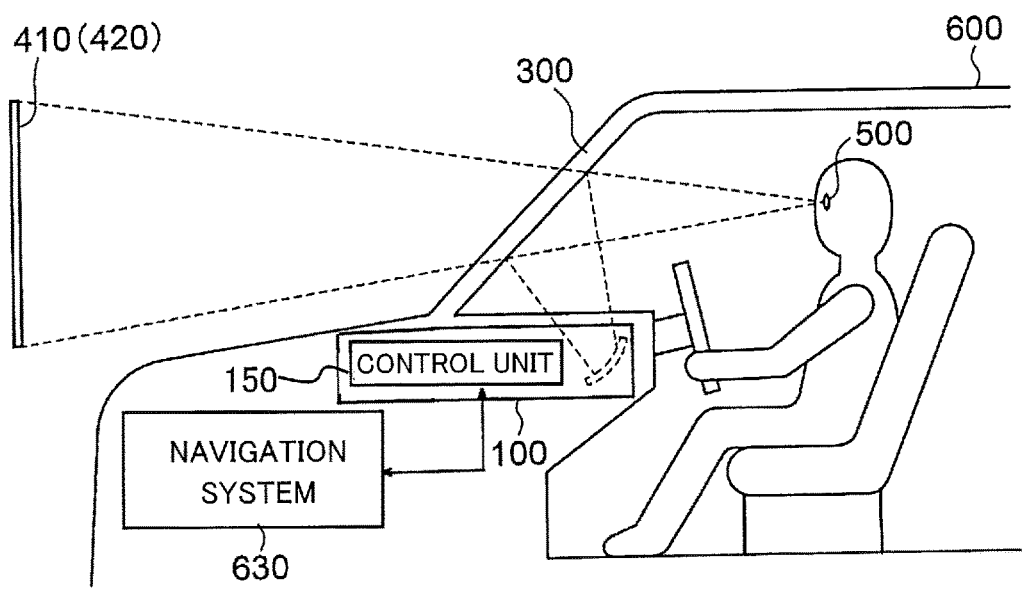
FIGS. 9(A), 9(B) and 9(C) are schematic diagrams for explaining other examples of the switching control of the virtual image display distance in the virtual image display device of the first embodiment.

FIG. 9(A) is a schematic diagram for explaining another example of the switching control of the virtual image display distance performed by the control unit 150 of the virtual image display device 100.

In the example shown in FIG. 9(A), the control unit 150 acquires current location information on the vehicle 600 from the navigation system 630 installed in the vehicle 600.

When a current location of the vehicle 600 is on an ordinary road, the control unit 150 applies no voltage to the polarization switching element 112. Then, the virtual image display device 100 displays the first virtual image 410 at the first distance 411 (position "e") close to the driver.

In contrast, when the current location of the vehicle 600 is on an expressway, the control unit 150 applies the voltage to the polarization switching element 112. Then, the virtual image display device 100 displays the second virtual image 420 at the second distance 421 (position "f") far from the driver.

Incidentally, for the vehicle 600, the frequency of traveling on an ordinary road is generally higher than the frequency of traveling on an expressway. For this reason, the virtual image display device 100 is configured to display the first virtual image 410 at the first distance 411 close to the driver in the state where no voltage is applied to the polarization switching element 112.

However, the power consumption of the polarization switching element 112 is extremely low. Therefore, the virtual image display device 100 may also be configured to display the first virtual image 410 at the first distance 411 close to the driver in the state where the voltage is applied to the polarization switching element 112 and to display the second virtual image 420 at the second distance 421 far from the driver in the state where no voltage is applied to the polarization switching element 112.

Here, the virtual image display device is configured to display the virtual image at the second distance 421 far from the driver, when the vehicle 600 is traveling at high speed. However, the virtual image display device is not limited to such a configuration.

For example, in cases where an arrow indicating the direction of a right turn or a left turn at an intersection or the like is displayed, the virtual image display distance may be switched according to a distance from the current location of the vehicle 600 to a targeted intersection. The arrow indicating the direction will be referred to as a "direction indicator arrow".

In this case, the control unit 150 acquires the current location information on the vehicle 600 and position information on the intersection where the vehicle 600 is planned to make a right turn or a left turn from the navigation system 630 (FIG. 9(A)), for example.

When the distance from the current location of the vehicle 600 to the intersection is longer than or equal to a prescribed distance, the virtual image display device 100 displays the direction indicator arrow at the second distance 421 (position "f") far from the driver. In contrast, when the distance from the current location of the vehicle 600 to the intersection is less than the prescribed distance, the virtual image display device 100 displays the direction indicator arrow at the first distance 411 (position "e") close to the driver.

The closer the intersection where the vehicle 600 is planned to make a right turn or a left turn gets, the higher the possibility that the driver is watching a position in the vicinity of the vehicle 600 gets. Therefore, the above method facilitates the driver's recognition of the direction indicator arrow.

Further, in addition to the switching of the virtual image display distance, it is also possible to change a size of a displayed content.

Figure 9B:
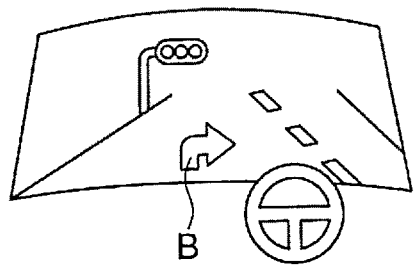
Figure 9C:
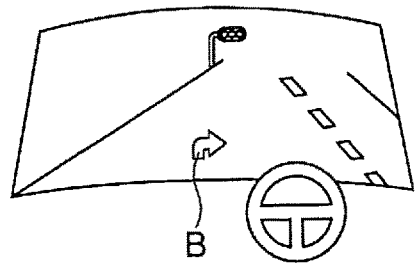

FIGS. 9(B) and 9(C) are schematic diagrams showing display examples of a direction indicator arrow B. FIG. 9(B) is a diagram showing a case where the distance from the current location to the intersection is short. FIG. 9(C) is a diagram showing a case where the distance from the current location to the intersection is long.

For example, as shown in FIGS. 9(B) and 9(C), the direction indicator arrow B is displayed larger as the distance from the current location to the intersection decreases. Alternatively, the direction indicator arrow B is displayed smaller as the distance from the current location to the intersection increases. This can allows the driver to feel the sense of distance to the intersection.

Cases where information for calling attention is displayed as a virtual image are also considered. The information for calling attention will be referred to also as attention-calling information or warning information. The information for calling attention is information indicating an obstacle such as a fallen object, a pedestrian, or the like in front of the vehicle, for example. The obstacle, pedestrian or the like will hereinafter be referred to as an "attention object".

Figure 10:
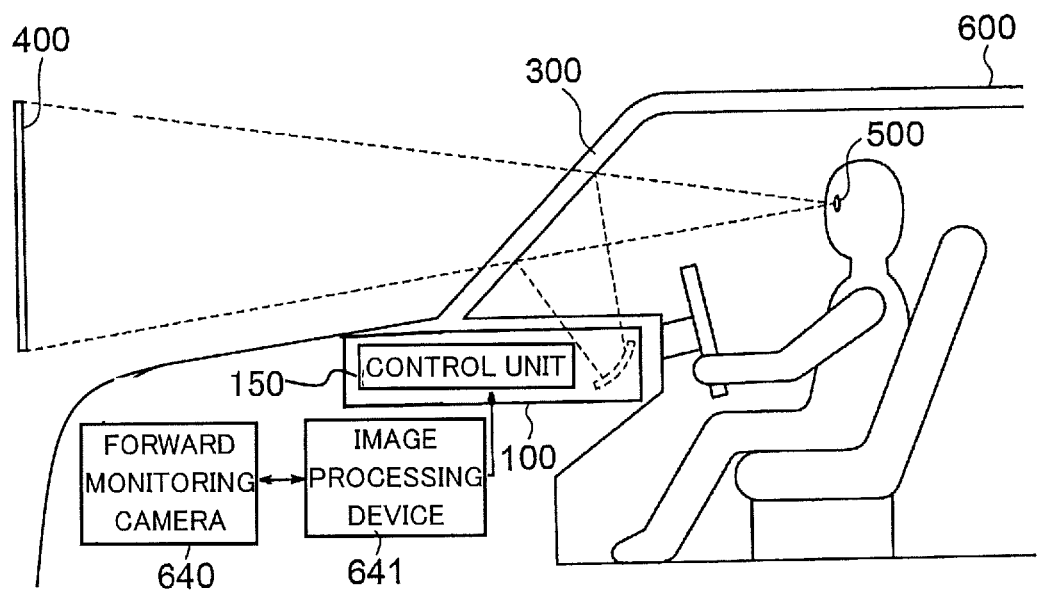
FIG. 10 is a schematic diagram for explaining another example of the switching control of the virtual image display distance in the virtual image display device of the first embodiment.

It is also possible to switch the virtual image display distance according to a distance from the vehicle to the attention object. FIG. 10 is a schematic diagram for explaining another example of the switching control of the virtual image display distance.

For example, as shown in FIG. 10, there are cases where the vehicle 600 is equipped with a forward monitoring system in which a forward monitoring camera 640 and an image processing device 641 are combined. The forward monitoring camera 640 is a camera mounted on the vehicle 600, and for monitoring a scene in front of the vehicle 600.

The forward monitoring camera 640 acquires an image of the view in front of the vehicle 600. The image processing device 641 calculates the distance from the current location of the vehicle 600 to the attention object on the basis of the image of the view in front of the vehicle acquired by the forward monitoring camera 640. The control unit 150 of the virtual image display device 100 acquires, from the image processing device 641, information on the distance to the attention object.

When the distance to the attention object is longer than or equal to a prescribed distance, the virtual image display device 100 displays attention-calling information such as "Proceed with Caution" at the second distance 421 (position "f") far from the driver. In contrast, when the distance to the attention object is less than the prescribed distance, the virtual image display device 100 displays the attention-calling information at the distance 411 (position "e") close to the driver. Thereby, the effect of calling the driver's attention can be enhanced.

<Effects of First Embodiment>

As described above, according to the first embodiment, the polarization direction of the light beam is switched by the polarization switching element 112. By the switching of the polarization direction of the light beam, the optical path length is switched in the optical path unit 120. By the switching of the optical path length, the virtual image display distance is switched. The virtual image display distance is the distance from the driver to the position where the virtual image is displayed.

Therefore, the virtual image display distance can be switched in a short time in comparison with the configuration for switching the virtual image display distance by moving the screen. Further, this embodiment can contribute to the downsizing of the virtual image display device 100 since it is unnecessary to provide a mechanism for moving the screen.

The polarization switching element 112 switches the polarization direction of the light beam before the light beam is scanned two-dimensionally by the scan unit 113 (e.g., MEMS mirror). Accordingly, the bundle of light beams entering the polarization switching element 112 is thin, and thus the polarization switching element 112 can be foiled with a small-sized element.

Further, the optical path unit 120 can be realized by adding the optical path unit 120 to an optical path provided in a general virtual image display device. Here, the optical path provided in a general virtual image display device corresponds to the optical path from the screen 114 to the magnifying mirror 130 in the first embodiment. Thus, the virtual image display distance can be switched with the simple device configuration.

Incidentally, as mentioned earlier, the optical path unit 120 includes the first polarizing mirror 121, the first reflecting mirror 123, the second reflecting mirror 124 and the second polarizing mirror 122, for example.

The virtual image display device 100 switches the virtual image display distance on the basis of the traveling speed of the vehicle, the distance from the current location of the vehicle to the intersection, the distance from the vehicle to the attention object, or the like. Accordingly, the virtual image display device 100 is capable of displaying the virtual image in the vicinity of the position the driver is watching. Moreover, the virtual image display device 100 can improve the driver's visibility. Incidentally, the intersection means the intersection where the vehicle is planned to make a right turn or a left turn.

In the first embodiment, the polarization switching element 112 is arranged on the incidence side (the light source unit 111's side) of the scan unit 113. However, the configuration that the polarization switching element 112 is arranged between the light source unit 111 and the optical path unit 120 is possible. For example, the polarization switching element 112 may be arranged between the scan unit 113 and the screen 114. The polarization switching element 112 may also be arranged on the emitting side of the screen 114.

In the first embodiment, the configuration that the light beam travels through the first optical path 210 when no voltage is applied to the polarization switching element 112 and the light beam travels through the second optical path 220 when the voltage is applied to the polarization switching element 112 is adopted. However, conversely, the configuration that the light beam travels through the first optical path 210 when the voltage is applied to the polarization switching element 112 and the light beam travels through the second optical path 220 when no voltage is applied to the polarization switching element 112 may also be adopted.

In the first embodiment, the first polarization direction (FIG. 5(A)) is set as a polarization direction rotated clockwise from the vertical direction by 45 degrees at an incidence surface of the optical path unit 120 and the second polarization direction (FIG. 5(B)) is set as a polarization direction rotated counterclockwise from the vertical direction by 45 degrees at the incidence surface of the optical path unit 120. However, the relationship between the first polarization direction and the second polarization direction may be reversed.

<First Modification of Configuration>

Figure 11A:
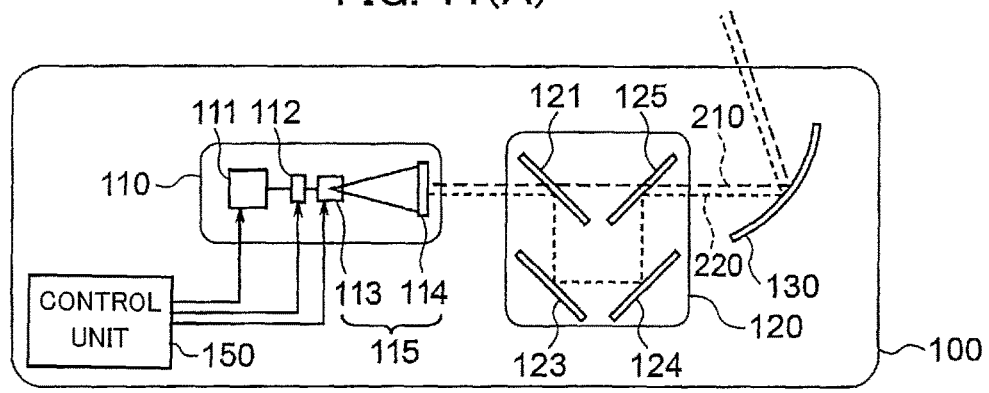
FIGS. 11(A) and 11(B) are a diagram showing a modification in which a half mirror is provided instead of a second polarizing mirror in the virtual image display device of the first embodiment and a diagram showing a modification in which a polarization plate is added further.

FIG. 11(A) is a diagram showing a first modification of the configuration of the virtual image display device 100, wherein a half mirror 125 is used instead of the second polarizing mirror 122. The half mirror 125 transmits half of the light amount of the incoming light beam and reflects the other half of the light amount of the incoming light beam irrespective of the polarization direction.

In the virtual image display device 100 shown in FIG. 11(A), the half mirror 125 is arranged at the same position as the second polarizing mirror 122 (FIG. 1(A)). The light beam that has been transmitted through the first polarizing mirror 121 is incident upon the half mirror 125, and half of the light amount of that light beam is transmitted through the half mirror 125 and is incident upon the magnifying mirror 130.

In contrast, the light beam reflected by the first polarizing mirror 121 is successively reflected by the first reflecting mirror 123 and the second reflecting mirror 124 and is incident upon the half mirror 125. Half of the light amount of the light beam incident upon the half mirror 125 from the second reflecting mirror 124 is reflected by the half mirror 125 and is incident upon the magnifying mirror 130.

The half mirror is inferior to the polarizing mirror in terms of utilization efficiency of light since half of the light amount of the incoming light beam is not utilized, but is advantageous in terms of low cost.

While the polarization direction of the light beam outputted from the light source unit 111 (first polarization direction) is set in a direction inclined by 45 degrees with respect to the vertical direction in the first embodiment, the polarization direction of the light beam may be in the vertical direction.

<Second Modification of Configuration>

Figure 11B:
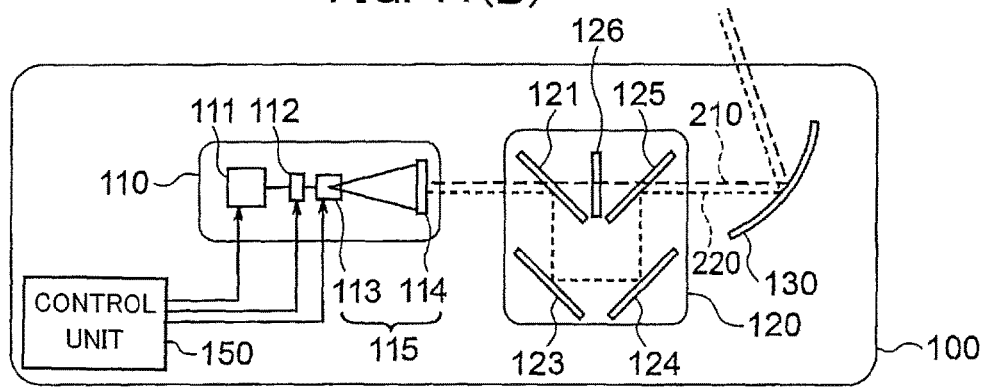

FIG. 11(B) is a diagram showing a second modification of the configuration of the virtual image display device 100, in which the polarization direction of the light beam is in the vertical direction.

In the virtual image display device 100 shown in FIG. 11(B), an optical element for rotating the polarization direction by 90 degrees is arranged between the first polarizing mirror 121 and the half mirror 125. The optical element for rotating the polarization direction by 90 degrees is a half-wave plate ($\lambda/2$ plate) 126, for example. Further, the first polarizing mirror 121 is arranged so as to transmit light having a polarization direction in the horizontal direction and reflect light having a polarization direction in the vertical direction.

When the voltage is applied to the polarization switching element 112 in the virtual image display device 100 shown in FIG. 11(B), the polarization switching element 112 switches the polarization direction of the light beam (vertical direction) to the horizontal direction. The first polarizing mirror 121 transmits the light beam having a polarization direction in the horizontal direction.

The polarization direction of the light beam that has been transmitted through the first polarizing mirror 121 is switched to the vertical direction by the half-wave plate 126 and thereafter the light beam is incident upon the half mirror 125. Half of the light amount of the light beam incident upon the half mirror 125 from the half-wave plate 126 is transmitted through the half mirror 125 and is incident upon the magnifying mirror 130.

When no voltage is applied to the polarization switching element 112, the polarization switching element 112 does not switch the polarization direction of the light beam. Therefore, the light beam having the polarization direction in the vertical direction is incident upon the first polarizing mirror 121.

The light beam having the polarization direction in the vertical direction is reflected by the first polarizing mirror 121. Then, the light beam reflected by the first polarizing mirror 121 is successively reflected by the first reflecting mirror 123 and the second reflecting mirror 124 and is incident upon the half mirror 125. Then, half of the light amount of the light beam incident upon the half mirror 125 from the second reflecting mirror 124 is reflected by the half mirror 125 and is incident upon the magnifying mirror 130.

Thereby, when the first virtual image 410 is found at the first distance 411 (position "e") close to the driver, the polarization direction of the light beam forming the virtual image is in the vertical direction. Also when the second virtual image 420 is famed at the second distance 421 (position "f") far from the driver, the polarization direction of the light beam forming the virtual image is in the vertical direction. In other words, the polarization direction of the light of the first virtual image 410 and the polarization direction of the light of the second virtual image 420 are both in the vertical direction. Therefore, the driver can visually recognize the virtual image even if the driver wears the polarized sunglasses interrupting light having a polarization direction in the horizontal direction.

The above description has been given assuming that the polarization direction of the light beam is in the direction inclined by 45 degrees with respect to the vertical direction, in the vertical direction, or in the horizontal direction. However, the angle of the polarization direction does not need to be set strictly but may have an error of several degrees. Nonetheless, in consideration of utilization efficiency of light at the time of being transmitted through or being reflected by each optical element, errors in relative angles of the light source unit 111, the polarization switching element 112 and the polarizing mirrors 121 and 122, etc. of the optical path unit 120 are desired to be as small as possible.

In the first embodiment, the polarization switching element 112 is formed with a liquid crystal element that switches the polarization direction of the incoming light beam according to the presence/absence (ON/OFF) of the applied voltage. However, the polarization switching element 112 is not limited to a liquid crystal element as long as it is one that switches the polarization direction of the light beam outputted from the light source unit 111. For example, it is also possible to mechanically change whether a half-wave plate is arranged in the optical path or not. The position where the half-wave plate is arranged is between the light source unit 111 and the scan unit 113, for example.

In the first embodiment, the second optical path 220 is provided below the first optical path 210. However, the second optical path 220 may be provided above the first optical path 210. Further, the second optical path 220 may be provided on the back side or on the front side of the paper surfaces with respect to the first optical path 210.

The configuration of the optical path unit 120 is not limited to the configuration shown in FIG. 1(A). The optical path unit 120 may be configured so that an optical path of a different optical path length can be selected according to the polarization direction of the incoming light beam.

In the first embodiment, an image is displayed on the screen 114 by scanning the light beams of three colors (laser beams) emitted from the light source unit 111 with the scan unit 113. However, the virtual image display device is not limited to such a configuration.

For example, an image may be displayed by employing a DLP (Digital Light Processing: registered trademark) using a DMD (Digital Mirror Device) and so on. In other words, the DLP may be employed as the image generation unit 115. The DLP is an image formation element in which micromirrors are arranged in a two-dimensional array. The polarization switching element 112 may be arranged at a position through which the image light formed by the DLP passes so as to switch the polarization direction of the image light.

It is also possible to employ a liquid crystal display unit (liquid crystal display) as the image generation unit 115 instead of the scan unit 113 and the screen 114. In this case, the liquid crystal display unit is arranged at the position of the screen 114 shown in FIG. 1, for example. The polarization switching element 112 is arranged at a position through which the outgoing light beam from the liquid crystal display unit (image light) passes and thereby the polarization direction of the image light is switched. The light source unit 111 can be configured as a backlight for the liquid crystal display unit.

The light beams for displaying an image are not limited to laser beams. However, since the optical path length is changed by use of polarization, laser beams having the polarization properties are suitable for the virtual image display device 100 in comparison with other types of light beams such as LED light beams.

In the first embodiment, examples of switching the virtual image display distance according to the information regarding the driving status of the vehicle (traveling speed, current location, attention object, etc.) have been described. However, it is also possible to display different images (contents) at the first distance 411 (position "e") and at the second distance 421 (position "f") in a time-sharing manner, for example.

<Modification of Display Method>

Figure 12A:
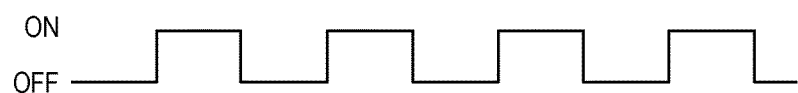
FIGS. 12(A) and 12(B) are diagrams for explaining a modification in which images are displayed at different display distances in a time-sharing manner in the virtual image display device of the first embodiment.
Figure 12B:
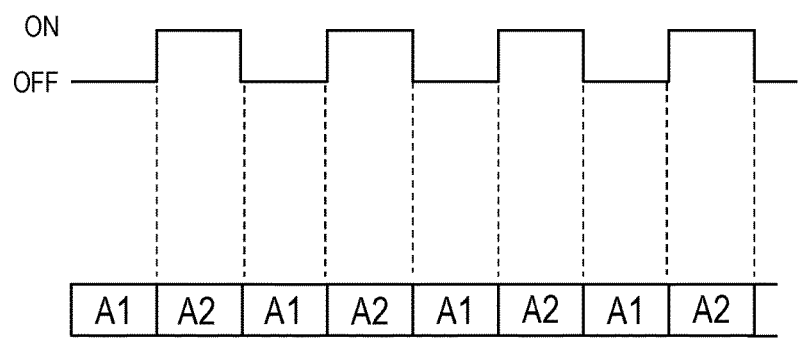

FIGS. 12(A) and 12(B) are diagrams for explaining a modification in which images are displayed at different display distances in a time-sharing manner.

FIG. 12(A) is a schematic diagram showing an energization pattern of the polarization switching element 112. The vertical axis represents magnitude of the voltage. The horizontal axis represents time. On the vertical axis, a high voltage is represented as "ON" and a low voltage is represented as "OFF". A state "ON" is a state in which the voltage is applied, while a state "OFF" is a state in which no voltage is applied. To "apply the voltage" means to supply the voltage. FIG. 12(A) shows an example in which the voltage changes so as to form a rectangular wave.

FIG. 12(B) is a schematic diagram showing types of the displayed images in a time series. A timing of switching between images A1 and A2 is in sync with a timing of switching of the rectangular wave in FIG. 12(A). The image A1 is displayed in a state in which the voltage is "OFF". The image A2 is displayed in a state in which the voltage is "ON".

In this case, the control unit 150 switches the ON and OFF of the voltage of the polarization switching element 112 at a constant cycle as shown in FIG. 12(A). In sync with the timing of the ON and OFF of the voltage of the polarization switching element 112, the images A1 and A2 are displayed alternately as shown in FIG. 12(B) by the light source unit 111 and the scan unit 113.

The image A1 is the image displayed in the state in which no voltage is applied to the polarization switching element 112 (OFF state). The image A1 corresponds to, for example, the first virtual image 410 displayed at the first distance 411 (position "e") close to the driver. The image A2 is the image displayed in the state in which the voltage is applied to the polarization switching element 112 (ON state). The image A2 corresponds to, for example, the second virtual image 420 displayed at the second distance 421 (position "f") far from the driver.

Thereby, the images A1 and A2 appear to the driver as if the images were displayed at the same time. However, it is difficult for the driver to visually recognize the images if the images A1 and A2 are displayed exactly in the same area. Thus, it is desirable to display the images A1 and A2 in separate areas as shown in FIG. 13, for example.

Figure 13:
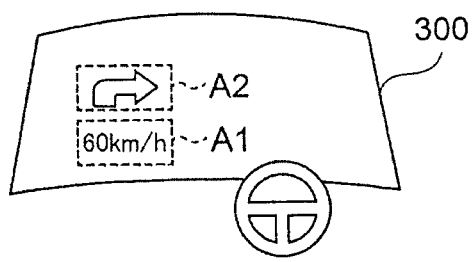
FIG. 13 is a schematic diagram showing an example of virtual images displayed in the modification shown in FIG. 12.

FIG. 13 is a schematic diagram showing an example of the displayed virtual images. The image A1 indicates "60 km/h". The image A2 indicates a right-turn arrow. The images A1 and A2 are displayed on the left-hand side of the windshield 300. The image A1 is displayed under the image A2.

Especially, the driver's eyes tend to focus on a position in a short distance when the driver looks downward. Therefore, it is desirable to display the image A1 (first virtual image 410) in a lower area and the image A2 (second virtual image 420) in an upper area as shown in FIG. 13.

The image A1 is, for example, information on the traveling speed of the vehicle based on the information acquired from the traveling speed sensor 620 (FIG. 8). The image A2 is, for example, the direction indicator arrow B based on the information acquired from the navigation system 630 (FIG. 9(A)). The image A2 may also be the aforementioned attention-calling information.

When the driver is watching the vicinity of the vehicle, the image A1 (first virtual image 410) at the first distance 411 close to the driver is clearly seen by the driver. Further, on this occasion, the image A2 (second virtual image 420) at the second distance 421 far from the driver looks blurred to the driver.

Conversely, when the driver is watching far positions, the image A2 (second virtual image 420) is clearly seen by the driver. Further, on this occasion, the image A1 (first virtual image 410) looks blurred to the driver. Accordingly, different pieces of information can be visually recognized according to a position the driver watches.

Second Embodiment

Next, a virtual image display device 100A according to a second embodiment of the present invention will be described. The virtual image display device 100A of the second embodiment differs from the virtual image display device 100 of the first embodiment in a configuration of an image display unit 110A. The other parts are equivalent to those of the virtual image display device 100 of the first embodiment. In the following, difference from the virtual image display device 100 of the first embodiment will be explained. Components identical or corresponding to those of the virtual image display device 100 of the first embodiment are assigned the identical reference characters and explanation thereof is omitted.

The components identical to those of the virtual image display device 100 of the first embodiment are the light source unit 111, the scan unit 113, the screen 114, the optical path unit 120, the magnifying mirror 130 and the control unit 150.

Figure 14:
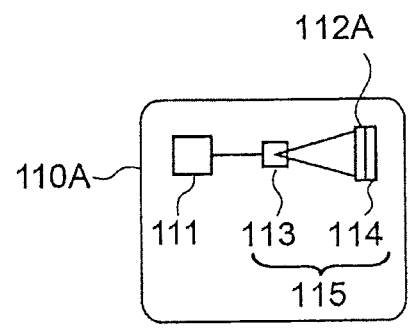
FIG. 14 is a diagram showing an image display unit in a virtual image display device according to a second embodiment of the present invention.

FIG. 14 is a diagram showing the image display unit 110A in the virtual image display device 100A of the second embodiment. The image display unit 110A includes the light source unit 111, a polarization switching unit 112A and the image generation unit 115. In the following description, the polarization switching unit 112A will be described as a polarization switching element. The image generation unit 115 will be described as a configuration including the scan unit 113 and the screen 114, for example. The configuration of the light source unit 111, the scan unit 113 and the screen 114 is as described in the first embodiment.

In the second embodiment, the polarization switching element 112A is arranged to adjoin the incidence side of the screen 114. To "adjoin" means to be adjacent to each other. Differently from the first embodiment, the polarization switching element 112A is arranged between the scan unit 113 and the screen 114. In FIG. 14, the polarization switching element 112A is arranged to be in contact with the screen 114. The incidence side of the screen 114 is on the light source unit 111's side with respect to the screen 114.

The polarization switching element 112A has approximately the same size as the screen 114. In FIG. 14, the polarization switching element 112A is in the same size as the screen 114. However, the size of the polarization switching element 112A does not need to be strictly the same as the size of the screen 114. The polarization switching element 112A may have a size with which the whole of the light beam which enters the screen 114 passes through the polarization switching element 112A. Thus, in cases where the polarization switching element 112A differs in size from the screen 114, the polarization switching element 112A is smaller than the screen 114.

Like the polarization switching element 112 in the first embodiment, the polarization switching element 112A is an element which is capable of switching the polarization direction by application of voltage. However, differently from the polarization switching element 112 in the first embodiment, it is configured to be able to control the applied voltage in regard to each pixel. The polarization switching element 112A includes, for example, a switch for controlling the presence/absence (ON/OFF) of the voltage applied to the liquid crystal layer independently for each pixel like a general liquid crystal panel.

When the voltage is applied to no pixel of the polarization switching element 112A, the light beam travels through the first optical path 210 as shown in FIG. 7(A). When the voltage is applied to all the pixels of the polarization switching element 112A, the light beam travels through the second optical path 220 as shown in FIG. 7(B).

Figure 15:
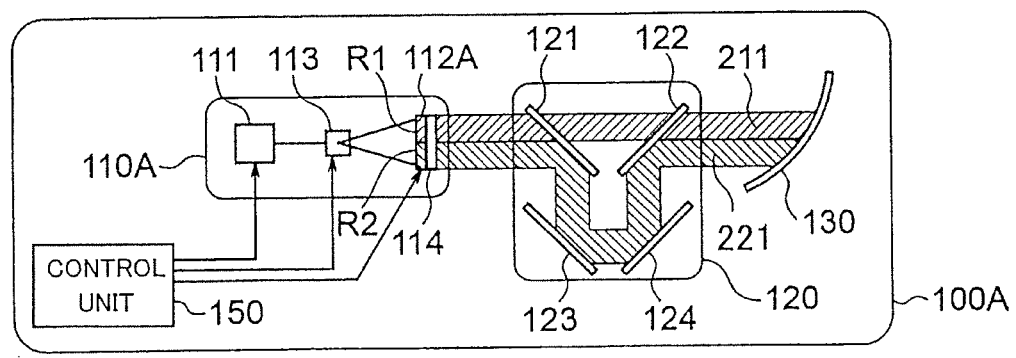
FIG. 15 is a diagram showing optical paths in the virtual image display device of the second embodiment.

FIG. 15 is a diagram showing optical paths of image light in the virtual image display device 100A according to the second embodiment. In FIG. 15, the virtual image display device 100A applies no voltage to an upper half area (voltage non-application area R1) of the polarization switching element 112A. Meanwhile, the virtual image display device 100A applies the voltage to a lower half area (voltage application area R2) of the polarization switching element 112A.

A light beam that has been transmitted through the voltage non-application area R1 of the polarization switching element 112A passes through the first polarizing mirror 121 and the second polarizing mirror 122 and is incident upon the magnifying mirror 130. In other words, the light beam that has been transmitted through the voltage non-application area R1 of the polarization switching element 112A travels through a first optical path 211.

On the other hand, a light beam that has been transmitted through the voltage application area R2 of the polarization switching element 112A is successively reflected by the first polarizing mirror 121, the first reflecting mirror 123, the second reflecting mirror 124 and the second polarizing mirror 122 and is incident upon the magnifying mirror 130. In other words, the light beam that has been transmitted through the voltage application area R2 of the polarization switching element 112A travels through a second optical path 221.

By the light beam that has traveled through the first optical path 211, the image A1 (first virtual image 410) is displayed at the first distance 411 (position "e") close to the driver. By the light beam that has traveled through the second optical path 221, the image A2 (second virtual image 420) is displayed at the second distance 421 (position "f") far from the driver. Thus, the image A1 and the image A2 are displayed at the same time as shown in the aforementioned FIG. 13.

Incidentally, due to the reflecting function of the magnifying mirror 130, the image displayed on the screen 114 is inverted vertically. Therefore, the image A1 (first virtual image 410) formed by the light beam that has passed through the upper half voltage non-application area R1 of the polarization switching element 112A is displayed on the lower side. The image A2 (second virtual image 420) formed by the light beam that has passed through the lower half voltage application area R2 of the polarization switching element 112A is displayed on the upper side.

As explained referring to FIG. 13, the image A1 is, for example, information such as the traveling speed of the vehicle based on the information acquired from the traveling speed sensor 620 (FIG. 8). The image A2 is, for example, the direction indicator arrow, the attention-calling information or the like based on the information acquired from the navigation system 630 (FIG. 9(A)).

When the driver is watching the vicinity of the vehicle, the image A1 (first virtual image 410) at the first distance

411 close to the driver is clearly seen. Further, on this occasion, the image A2 (second virtual image 420) at the second distance 421 far from the driver looks blurred to the driver.

Conversely, when the driver is watching far positions, the image A2 (second virtual image 420) is clearly seen. Further, on this occasion, the image A1 (first virtual image 410) looks blurred to the driver.

The control unit 150 of the virtual image display device 100A performs control so as to apply no voltage to pixels corresponding to the upper half area (voltage non-application area R1) of the polarization switching element 112A. Meanwhile, the control unit 150 performs control so as to apply the voltage to pixels corresponding to the lower half area (voltage application area R2) of the polarization switching element 112A.

Further, the control unit 150 performs drive control of the light source unit 111 and the scan unit 113 so as to display the image A1 in an upper area of the screen 114. Meanwhile, the control unit 150 performs drive control of the light source unit 111 and the scan unit 113 so as to display the image A2 in a lower area of the screen 114.

Here, it has been assumed that the voltage applied to the polarization switching element 112A is controlled in regard to each pixel. However, the control of the applied voltage is not limited to such control in regard to each pixel. The control of the voltage applied to the polarization switching element 112A may be performed in regard to each area of the polarization switching element 112A. For example, the control of the voltage applied to the polarization switching element 112A is performed in the upper half area and in the lower half area of the polarization switching element 112A.

As described above, according to the second embodiment of the present invention, the polarization switching element 112A switches the polarization direction in regard to each area (each pixel). Then, the virtual image display device 100A is capable of simultaneously displaying the virtual images at the two positions "e" and "f" differing in the distance from the driver. Accordingly, it is possible for the driver to visually recognize different pieces of information according to a position the driver watches.

In the second embodiment, the light beam that has been transmitted through the voltage non-application area R1 of the polarization switching element 112A travels through the first optical path 211. Meanwhile, the light beam that has been transmitted through the voltage application area R2 of the polarization switching element 112A travels through the second optical path 221. However, conversely, the configuration that the light beam that has been transmitted through the voltage non-application area R1 of the polarization switching element 112A travels through the second optical path 221 and the light beam that has been transmitted through the voltage application area R2 of the polarization switching element 112A travels through the first optical path 211 is also possible.

In the second embodiment, the polarization switching element 112A is arranged on the incidence side (light source unit 111's side) of the screen 114. However, it is also possible to arrange the polarization switching element 112A on the emitting side of the screen 114 (the side opposite to the light source unit 111's side).

That is, in the second embodiment, the polarization switching element 112A converts the polarization direction of the image light formed by the scan unit 113.

It is also possible, as explained in the first embodiment, to employ the liquid crystal display unit instead of the scan unit 113 and the screen 114 (the image generation unit 115). In this case, the liquid crystal display unit is arranged at the position of the screen 114 shown in FIG. 15, for example. The polarization switching element 112A is arranged at a position where the outgoing light beam from the liquid crystal display unit (image light) is incident. The light source unit 111 can be configured as the backlight for the liquid crystal display unit.

As explained in the first embodiment, the DLP may be employed instead of the scan unit 113 and the screen 114 (the image generation unit 115). That is, the DLP including micromirrors arranged in a two-dimensional array may be employed instead of the liquid crystal display unit.

In the second embodiment, the configuration that the whole of the light beam which enters the screen 114 passes through the polarization switching element 112A (the voltage non-application area R1 and the voltage application area R2) is adopted. However, the configuration that only a light beam which enters a particular area of the screen 114 passes through the polarization switching element 112A may also be adopted. The particular area of the screen 114 can be, for example, an area from the top ⅓ position to the ½ position of the screen 114.

In this case, the polarization switching element may be one that is able to switch the voltage application in regard to each pixel as explained in the second embodiment. The polarization switching element may also be one that is switch the voltage application in regard to the whole of the polarization switching element as explained in the first embodiment. With such features, it is possible for the virtual image display device 100A to switch the virtual image display distance exclusively for an image in a necessary area on the screen 114.

It is also possible to combine the configuration example in the second embodiment with the configuration example described in the first embodiment (FIG. 8-FIG. 11).

Third Embodiment

Next, a virtual image display device 100B according to a third embodiment of the present invention will be described. The virtual image display device 100B according to the third embodiment differs from the virtual image display device 100 according to the first embodiment in a configuration of an optical path unit 120B. The other parts are equivalent to those of the virtual image display device 100 of the first embodiment. In the following, difference from the virtual image display device 100 of the first embodiment will be explained. Components identical or corresponding to those of the virtual image display device 100 of the first embodiment are assigned the identical reference characters and explanation thereof is omitted.

The components identical to those of the virtual image display device 100 of the first embodiment are the image display unit 110 (the light source unit 111, the polarization switching element 112, the scan unit 113 and the screen 114), the first polarizing mirror 121, the second polarizing mirror 122, the first reflecting mirror 123, the second reflecting mirror 124, the magnifying mirror 130 and the control unit 150. However, the first reflecting mirror 123 and the second reflecting mirror 124 differ from those in the first embodiment in that the mirrors 123 and 124 in this embodiment are mounted on a moving unit 127. That is, the first reflecting mirror 123 and the second reflecting mirror 124 themselves are equivalent to those in the first embodiment.

Figure 16:
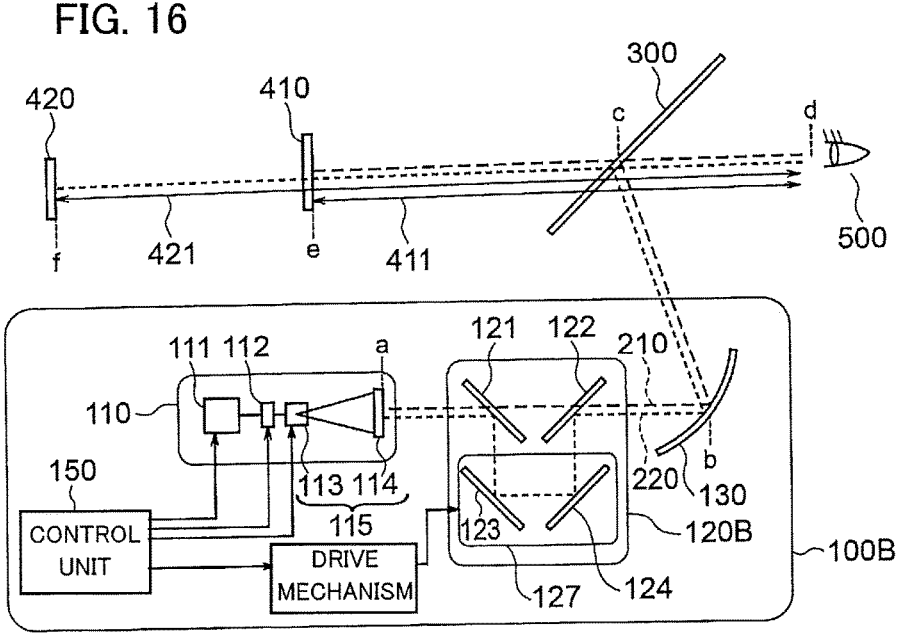
FIG. 16 is a diagram showing a configuration of a virtual image display device of a third embodiment of the present invention.

FIG. 16 is a diagram showing the virtual image display device 100B according to the third embodiment.

The optical path unit 120B of the virtual image display device 100B according to the third embodiment includes the moving unit 127 in addition to the optical path unit 120 described in the first embodiment. The first reflecting mirror 123 and the second reflecting mirror 124 are mounted on the moving unit 127. The moving unit 127 is movable in the vertical direction. Here, the vertical direction is the traveling direction of light reflected at the central position of the first polarizing mirror 121.

The virtual image display device 100B according to the third embodiment further includes a drive mechanism 160. The drive mechanism 160 moves the moving unit 127 in the vertical direction. The drive mechanism 160 is one in which a feed screw and a motor is combined, for example. However, the drive mechanism 160 is not limited to one using a feed screw and a motor. The drive mechanism 160 may be one that can reciprocate the moving unit 127. The control unit 150 controls driving of the motor of the drive mechanism 160.

The drive mechanism 160 moves the moving unit 127 in the vertical direction. The first reflecting mirror 123 and the second reflecting mirror 124 are mounted on the moving unit 127. Thus, the first reflecting mirror 123 and the second reflecting mirror 124 move in the vertical direction. Accordingly, the length of the optical path 220 changes.

For example, when the moving unit 127 moves downward, the optical path length of the second optical path 220 increases. Then, the position "f" where the second virtual image 420 is displayed moves in a direction of separating from the driver.

Conversely, when the moving unit 127 moves upward, the optical path length of the second optical path 220 decreases. Then, the position "f" where the second virtual image 420 is displayed moves in a direction of approaching the driver.

Here, according to the graph shown in FIG. 6, in a case where the distance Ldv is 10 m or longer, the distance Ldv changes greatly compared to the amount of change of the distance Lab. The distance Ldv is the distance from the position "d" of the driver's eyes 500 to the virtual image. The distance Lab is the distance from the position "a" of the screen 114 to the position "b" of the magnifying mirror 130.

Therefore, here, a position of the moving unit 127 is set so that the distance Ldv is 10 m or longer when the moving unit 127 is at a reference position in its moving range. The reference position is, for example, the central position in the moving direction of the moving unit 127.

With this setting, the display distance of the second virtual image 420 can be changed greatly by just moving the moving unit 127 slightly.

As described above, according to the third embodiment of the present invention, the first reflecting mirror 123 and the second reflecting mirror 124 are moved by moving the moving unit 127. Therefore, in addition to the effects of the first embodiment, it is possible for the virtual image display device 100B to adjust the display distance of the second virtual image 420.

Accordingly, it becomes possible to adjust the display distance of a virtual image to suit a real image in AR (Augmented Reality) display, for example. The "augmented reality" is a technology for augmenting reality environment perceived by a human by use of a computer. In the AR display, the virtual image is superimposed on the real image, for example.

The virtual image display device 100B is also capable of adjusting the display distance of the second virtual image 420 (second distance 421) according to driver's preferences.

In the third embodiment, the first reflecting mirror 123 and the second reflecting mirror 124 mounted on the moving unit 127 are moved in the vertical direction. However, the virtual image display device is not limited to such a configuration. The virtual image display device may be configured to move part of the components of the optical path unit 120 in a direction for changing the optical path length(s) of at least one of the first optical path 210 and second optical path 220.

For example, the first polarizing mirror 121 and the first reflecting mirror 123 may be moved in a forward or backward direction (left or right direction in FIG. 16). It is also possible to move the second reflecting mirror 124 and the second polarizing mirror 122 in the forward or backward direction.

Further, the screen 114 may be moved in the forward or backward direction (traveling direction of the laser beam that has been transmitted through the central position of the second polarizing mirror 122). It is also possible to move the entire image display unit 110 in the forward or backward direction.

With such configurations, the optical path lengths of both the first optical path 210 and the second optical path 220 can be adjusted. This makes it possible to adjust both the position "e" where the first virtual image 410 is displayed and the position "f" where the second virtual image 420 is displayed.

It is also possible to combine the third embodiment with the configuration example described in the first embodiment (FIG. 8-FIG. 11) or the second embodiment.

Fourth Embodiment

Next, a virtual image display device 100C according to a fourth embodiment of the present invention will be described. The virtual image display device 100C according to the fourth embodiment differs from the virtual image display device 100 according to the first embodiment in a configuration of an optical path unit 120C. The other parts are equivalent to those of the virtual image display device 100 of the first embodiment. In the following, difference from the virtual image display device 100 of the first embodiment will be explained. Components identical or corresponding to those of the virtual image display device 100 of the first embodiment are assigned the identical reference characters and explanation thereof is omitted.

The components identical to those of the virtual image display device 100 of the first embodiment are the image display unit 110 (the light source unit 111, the polarization switching element 112, the scan unit 113 and the screen 114), the polarizing mirror 121, the magnifying mirror 130 and the control unit 150.

Figure 17:
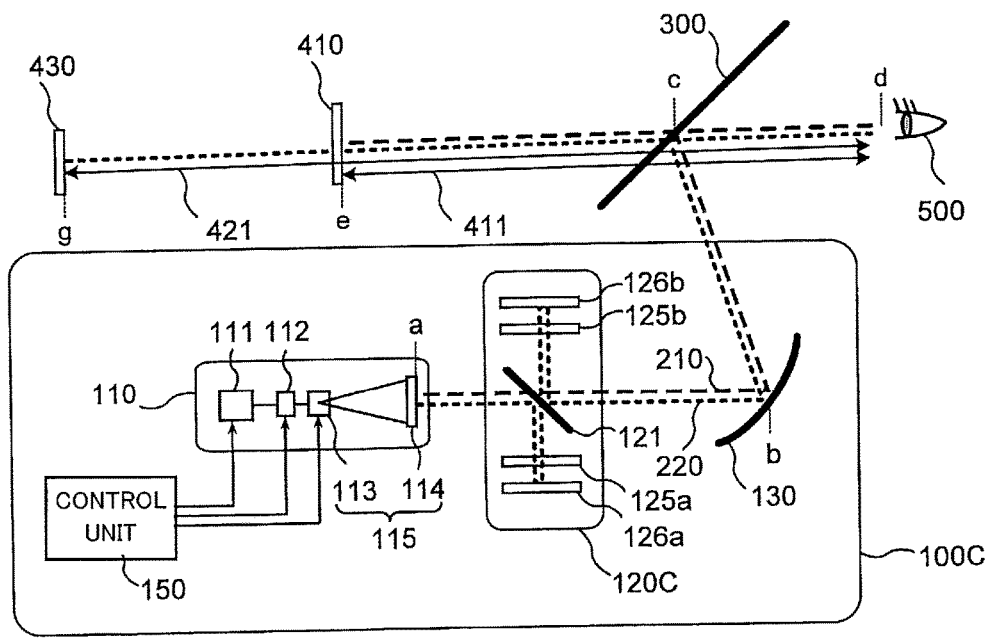
FIG. 17 is a diagram showing a configuration of a virtual image display device of a fourth embodiment of the present invention.

FIG. 17 is a diagram showing the virtual image display device 100C according to the fourth embodiment. The optical path unit 120C of the virtual image display device 100C according to the fourth embodiment includes the polarizing mirror 121 as the polarized beam splitter, a first quarter-wave plate 125a, a second quarter-wave plate 125b, a first mirror 126a and a second mirror 126b. The polarizing mirror 121 is equivalent to the polarizing mirror 121 of the optical path unit 120 described in the first embodiment.

The polarizing mirror 121 is arranged at a position where the image light from the image display unit 110 is incident. The first quarter-wave plate 125a and the first mirror 126a are arranged on an optical axis onto which the incoming light beam is reflected by the polarizing mirror 121. The second quarter-wave plate 125b and the second mirror 126b are arranged on the side opposite to the first quarter-wave plate 125*a* and the first mirror 126*a* across the polarizing mirror 121.

An example in which the polarizing mirror 121 has properties of transmitting the p-polarized light and reflecting the s-polarized light will be described below.

The light beam that has entered the optical path unit 120C is incident upon the polarizing mirror 121. When the light beam incident upon the polarizing mirror 121 is the p-polarized light, the light beam incident upon the polarizing mirror 121 is transmitted through the polarizing mirror 121 and travels through a first optical path 210. Then, a virtual image 410 is displayed at a position "e". The first optical path 210 is an optical path passing through the polarizing mirror 121.

In contrast, when the light beam incident upon the polarizing mirror 121 is the s-polarized light, the light beam incident upon the polarizing mirror 121 is reflected by the polarizing mirror 121 and travels through a second optical path 220. Then, a virtual image 430 is displayed at a position "g". The second optical path 220 is made up of the following optical paths (1), (2) and (3), for example:

(1) The light beam incident upon the polarizing mirror 121 is reflected by the polarizing mirror 121, is transmitted through the first quarter-wave plate 125*a*, is reflected by the first mirror 126*a*, thereafter is transmitted through the first quarter-wave plate 125*a* again, and is incident upon the polarizing mirror 121 again.

(2) The light beam incident upon the polarizing mirror 121 again is transmitted through the polarizing mirror 121, thereafter is transmitted through the second quarter-wave plate 125*b*, is reflected by the second mirror 126*b*, thereafter is transmitted through the second quarter-wave plate 125*b* again, and is incident upon the polarizing mirror 121 for the third time.

(3) The light beam incident upon the polarizing mirror 121 for the third time is reflected by the polarizing mirror 121 and travels towards the magnifying mirror 130.

Here, the reason why the second optical path 220 is formed as above will be explained. When the light beam incident upon the polarizing mirror 121 is the s-polarized light, the light beam is first reflected by the polarizing mirror 121. The light beam reflected by the polarizing mirror 121 travels downward in FIG. 17. The light beam traveling downward in FIG. 17 reaches the first quarter-wave plate 125*a*. The light beam of the s-polarized light (linearly polarized light) transmitted through the first quarter-wave plate 125*a* is converted into a light beam of circularly polarized light having a phase difference of 90 degrees. Then, the light beam of circularly polarized light reaches the first mirror 126*a*. At the first mirror 126*a*, the light beam of circularly polarized light is reflected without change. The light beam of circularly polarized light reflected by the first mirror 126*a* is transmitted through the first quarter-wave plate 125*a* again and thereby the phase difference is further incremented by 90 degrees. The light beam transmitted through the first quarter-wave plate 125*a* again is converted from circularly polarized light into linearly polarized light. Consequently, the light beam incident upon the polarizing mirror 121 again has been converted into the p-polarized light having a 180-degree phase difference and a polarization direction rotated by 90 degrees in comparison with the light beam incident upon the polarizing mirror 121 for the first time (s-polarized light).

The light beam converted into the p-polarized light by passing through the first quarter-wave plate 125*a* to and fro as above is transmitted through the polarizing mirror 121 and travels upward in FIG. 17. The light beam that has been transmitted through the polarizing mirror 121 reaches the second quarter-wave plate 125*b*. Like the above, the light beam that has been transmitted through the polarizing mirror 121 is transmitted through the second quarter-wave plate 125*b*, is converted into circularly polarized light having a phase difference of 90 degrees, and is reflected by the second mirror 126*b*. Then, the circularly polarized light reflected by the second mirror 126*b* is transmitted through the second quarter-wave plate 125*b* again and is thereby converted into the s-polarized light. The light beam returning to the polarizing mirror 121 again is reflected by the polarizing mirror 121 and travels towards the magnifying mirror 130.

With the above-described configuration, the virtual image display device 100C of the fourth embodiment has the following features as compared with the first through third embodiments: First, the optical path unit 120C includes only one polarizing mirror as a special optical component. Second, since the second optical path 220 is configured to have the light beam shuttle to and fro on the same optical path, the optical path unit 120C can be formed in a small space and the downsizing of the virtual image display device 100C becomes possible. The second optical path 220 is the optical path having the greater optical path length.

Incidentally, an arrangement of the first mirror 126*a* or the second mirror 126*b* may be fixed. Alternatively, the first mirror 126*a* or the second mirror 126*b* may be moved. In a configuration moving the first mirror 126*a* or the second mirror 126*b*, the mirror 126*a* or mirror 126*b* is moved in an upward or downward direction in FIG. 17. Thereby, the position "g" of the virtual image 430 can be changed.

In this case, only one of the first mirror 126*a* and the second mirror 126*b* may be moved. Both of the first mirror 126*a* and the second mirror 126*b* may also be moved in opposite directions.

Further, the virtual image display device may be configured to move the first quarter-wave plate 125*a* and the first mirror 126*a* together. The virtual image display device may also be configured to move the second quarter-wave plate 125*b* and the second mirror 126*b* together.

<Modification of Configuration>

Figure 18:
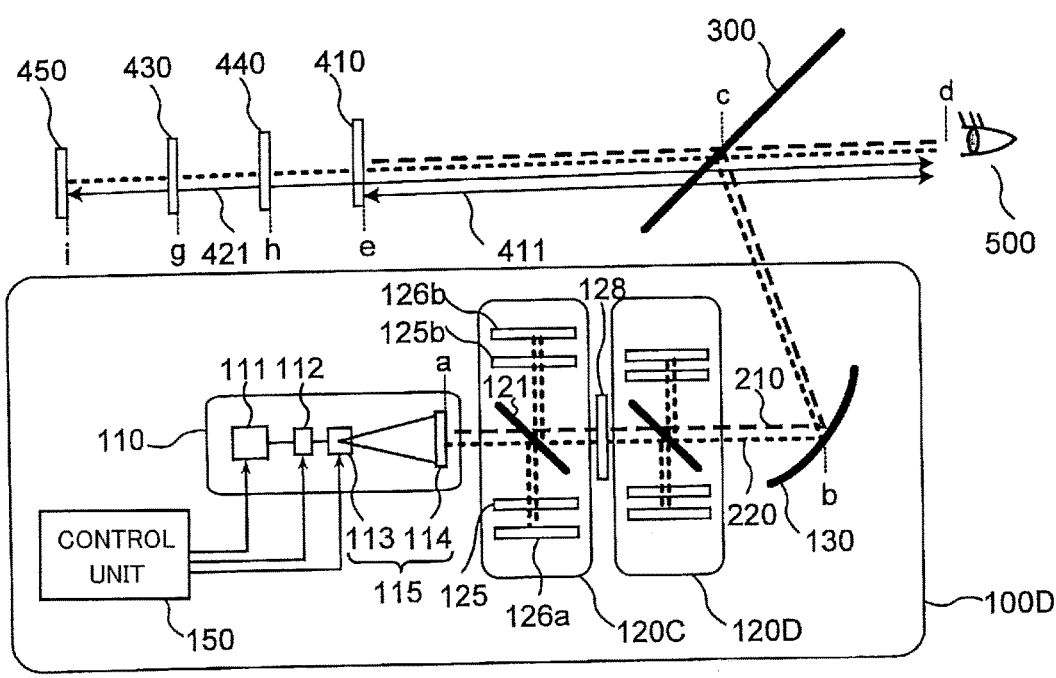
FIG. 18 is a diagram showing a modification of the configuration of the virtual image display device of the fourth embodiment of the present invention.

FIG. 18 is a diagram showing a modification of the configuration of the virtual image display device according to the fourth embodiment. The virtual image display device 100D of the modification shown in FIG. 18 further includes an optical path unit 120D in addition to the optical path unit 120C. The optical path unit 120D has a configuration equivalent to the optical path unit 120C except for the optical path length. Further, the virtual image display device 100D includes a second polarization switching unit 128 between the optical path unit 120C and the optical path unit 120D.

It is assumed here that the optical path length of the second optical path 220 differs between the optical path unit 120C and the optical path unit 120D. The second optical path 220 is the optical path having the greater optical path length in the optical path units. FIG. 18 shows a case where the optical path length in the optical path unit 120D is shorter than the optical path length in the optical path unit 120C.

The optical path unit 120C is arranged at a position where the image light from the image display unit 110 is incident. The second polarization switching unit 128 is arranged at a position where the light beam emerging from the optical path unit 120C is incident. The optical path unit 120D is arranged at a position where the light beam emerging from the second polarization switching unit 128 is incident.

The second polarization switching unit 128 is configured to be able to switch the light beam emitted therefrom between the light beam without changing the polarization direction of the incoming light beam and the light beam after changing the polarization direction of the incoming light beam by 90 degrees. The second polarization switching unit 128 is controlled by the control unit 150. Incidentally, an arrow from the control unit 150 to the second polarization switching unit 128 is omitted in FIG. 18.

When the light beam from the screen 114 is the p-polarized light and the second polarization switching unit 128 does not change the polarization direction, the light beam entering the optical path unit 120C travels through the first optical path 210. Specifically, the light beam entering the optical path unit 120C travels through the shorter optical path in the optical path unit 120C and the shorter optical path in the optical path unit 120D. Then, the virtual image 410 is displayed at the position "e". The polarization of the light beam emerging from the optical path unit 120C is not switched by the second polarization switching unit 128. Thus, the light beam emerging from the optical path unit 120C enters the optical path unit 120D as the p-polarized light.

Next, the second optical path 220 will be explained. In this modification, the second optical path 220 has three optical path lengths. Specifically, a virtual image 440 is displayed at a position "h", a virtual image 430 is displayed at a position "g", and a virtual image 450 is displayed at a position "i". The virtual image 440 is displayed farther than the virtual image 410. The virtual image 430 is displayed farther than the virtual image 440. The virtual image 450 is displayed farther than the virtual image 430.

First, the virtual image 440 displayed at the position "h" will be explained. In this case, the light beam from the screen 114 is the p-polarized light and the second polarization switching unit 128 changes the polarization direction of the incoming light beam by 90 degrees. The light beam entering the optical path unit 120C travels through the shorter optical path (first optical path 210) in the optical path unit 120C. The light beam emerging from the optical path unit 120C is switched by the second polarization switching unit 128 from the p-polarized light to the s-polarized light. The light beam switched to the s-polarized light travels through the longer optical path (second optical path 220) in the optical path unit 120D. By the light beam emerging from the optical path unit 120D, the virtual image 440 is displayed at the position "h".

Next, the virtual image 430 displayed at the position "g" will be explained. In this case, the light beam from the screen 114 is the s-polarized light and the second polarization switching unit 128 changes the polarization direction of the incoming light beam by 90 degrees. The light beam entering the optical path unit 120C travels through the longer optical path (second optical path 220) in the optical path unit 120C. The light beam emerging from the optical path unit 120C is switched by the second polarization switching unit 128 from the s-polarized light to the p-polarized light. The light beam switched to the p-polarized light travels through the shorter optical path (first optical path 210) in the optical path unit 120D. By the light beam emerging from the optical path unit 120D, the virtual image 430 is displayed at the position "g".

Finally, the virtual image 450 displayed at the position "i" will be explained. In this case, the light beam from the screen 114 is the s-polarized light and the second polarization switching unit 128 does not change the polarization direction of the incoming light beam. The light beam entering the optical path unit 120C travels through the longer optical path (second optical path 220) in the optical path unit 120C. The polarization direction of the light beam emerging from the optical path unit 120C is not changed by the second polarization switching unit 128. Thus, the light beam emerging from the optical path unit 120C enters the optical path unit 120D as the s-polarized light. The light beam entering the optical path unit 120D travels through the longer optical path (second optical path 220) in the optical path unit 120D. By the light beam emerging from the optical path unit 120D, the virtual image 450 is displayed at the position "i".

In the fourth embodiment, the quarter-wave plates 125a and 125b and the mirrors 126a and 126b are arranged in upward and downward directions from the polarizing mirror 121 in the fourth embodiment. However, the arrangement is not limited to such an arrangement. For example, the quarter-wave plates 125a and 125b and the mirrors 126a and 126b may be arranged in lateral directions from the polarizing mirror 121.

In the examples shown in FIGS. 17 and 18, a distance from the first polarizing mirror 121 to the first mirror 126a and a distance from the first polarizing mirror 121 to the second mirror 126b are set equal to each other. However, it is also possible to make one of the distances longer than the other. For example, they can be arranged at asymmetric distances according to a space in an automobile's dashboard. This improves the degree of freedom of installation of the virtual image display device in comparison with the configurations in the first through third embodiments.

It is also possible to combine the fourth embodiment with the first embodiment (FIGS. 1-7), its configuration example (FIG. 8-FIG. 11), the second embodiment or the third embodiment.

Fifth Embodiment

Next, a virtual image display device 100E according to a fifth embodiment of the present invention will be described. The virtual image display device 100E according to the fifth embodiment is a head mounted display attached to eyeglasses and so on, for example.

A basic configuration of the virtual image display device 100E according to the fifth embodiment is equivalent to that in the first embodiment. In the following, difference from the virtual image display device 100 of the first embodiment will be explained. Components identical or corresponding to those of the virtual image display device 100 of the first embodiment are assigned the identical reference characters.

Figure 19:
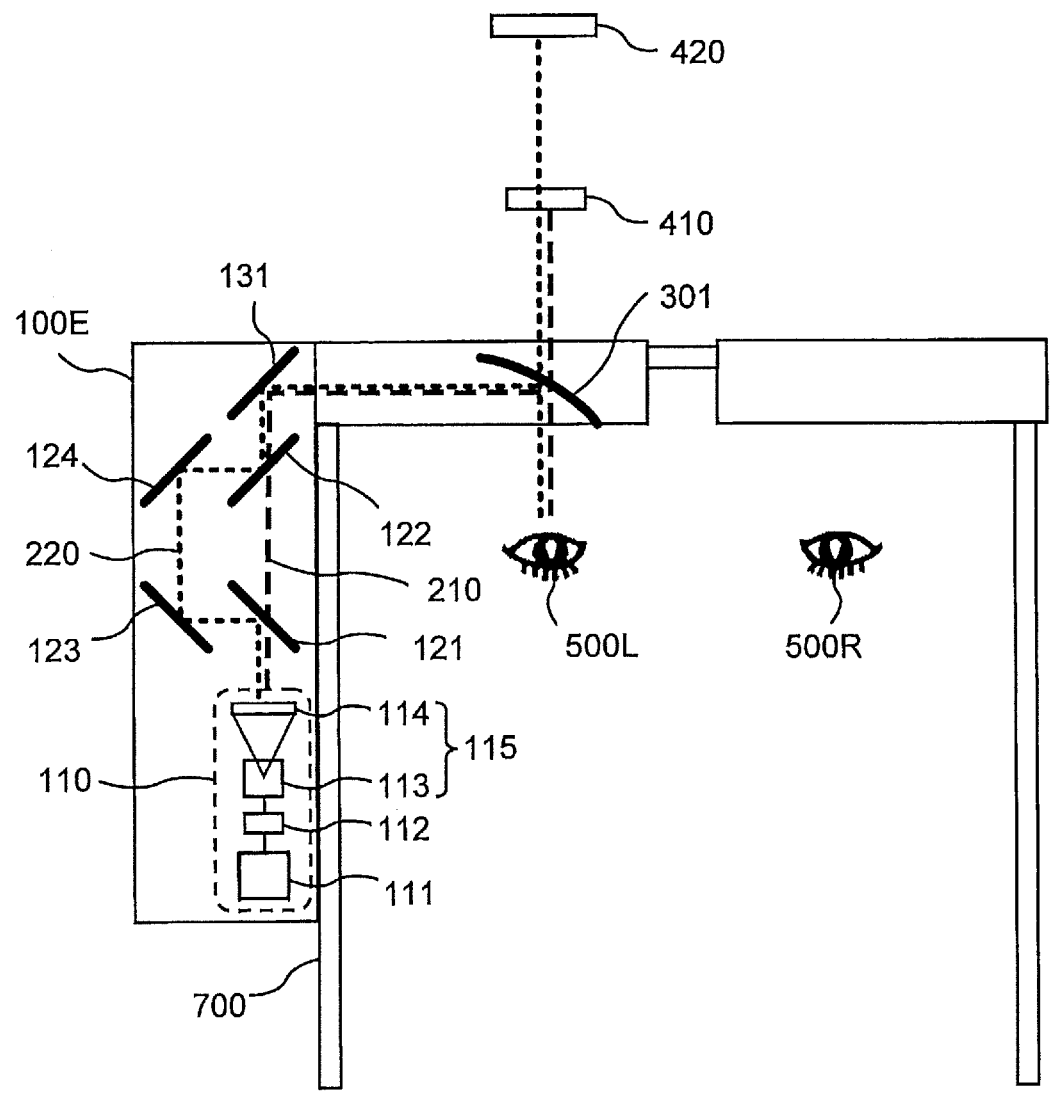
FIG. 19 is a diagram showing a configuration of a virtual image display device of a fifth embodiment of the present invention.

FIG. 19 is a diagram of an eyeglass-type head mounted display, as the virtual image display device 100E according to the fifth embodiment, viewed from above. The virtual image display device 100E according to the fifth embodiment is attached to eyeglasses 700. The image light from the image display unit 110 travels through an optical path 210 or an optical path 220 and is reflected by a mirror 131 towards lenses of the eyeglasses 700. The image light reflected by the mirror 131 is reflected by a mirror 301 included in a lens part of the eyeglasses 700. Then, a virtual image 410 or a virtual image 420 is visually recognizable to a person wearing the eyeglasses 700. Incidentally, the control unit 150 (FIG. 1) is omitted in FIG. 19.

Here, the mirror 301 corresponds to the windshield 300 (FIG. 1) in the first embodiment. For example, the image light is reflected towards an eye (left eye) 500L by a free-form surface mirror of a transmission type. The mirror 301 is not limited to the free-form surface mirror. For example, a hologram element, a diffraction element or the like which is capable of adjusting a diffraction angle of the light beam to a desired angle may be employed.

Like the first embodiment, the optical path through which the image light travels can be switched between the optical path 210 and the optical path 220 by switching the polarization direction of the image light by use of the polarization switching element 112. When the image light travels through the optical path 210, the virtual image 410 is visually recognizable at a position close from the eye (left eye) 500L. When the image light travels through the optical path 220, the virtual image 420 is visually recognizable at a position far from the eye (left eye) 500L.

The head mounted display displays an image or info Ration superimposed on a background, as image display for work support. Accordingly, if there is a great difference between a distance from the eyes to the virtual image (information) and a distance from the eyes to the background, the visibility deteriorates and a worker tends to feel fatigue. Therefore, a distance to the background in a case of superimposing information are measured separately and the switching is conducted between displaying the virtual image at a short distance and displaying the virtual image at a long distance, for example.

As described above, according to the fifth embodiment of the present invention, the distance at which the virtual image is displayed is switched in the head mounted display. Therefore, distance difference between the background and the superimposed information or image can be reduced. This makes it possible to improve the visibility and to lessen the fatigue of the worker.

While the configuration equivalent to the first embodiment is employed in the fifth embodiment as mentioned above, it is also possible to employ a configuration equivalent to the second, third or fourth embodiment. While the virtual image display device 100D is attached to the left eye 500L's side in the fifth embodiment, the virtual image display device 100D may be attached to the right eye 500R's side in a similar manner. It is also possible to attach the virtual image display device 100D to both the left eye 500L's side and the right eye 500R's side.

The virtual image display devices 100, 100A, 100B, 100C, 100D and 100E described above can be employed as, for example, head mounted displays or head-up displays for automobiles or the like. The virtual image display devices 100, 100A, 100B, 100C, 100D and 100E can be employed not only for automobiles but also for airplanes, a medical field and a variety of fields using virtual images.

DESCRIPTION OF REFERENCE CHARACTERS

100, 100A, 100B, 100C, 100D, 100E: virtual image display device, 110, 110A: image display unit, 111: light source unit, 11R, 11G, 11B: semiconductor laser, 11a, 11b, 11c: mirror, 112, 112A: polarization switching element, 113: scan unit, 113a: scan mirror, 114: screen, 115: image generation unit, 120, 120B, 120C: optical path unit, 121: first polarizing mirror, 122: second polarizing mirror, 123: first reflecting mirror, 124: second reflecting mirror, 125: half mirror, 125a: first quarter-wave plate, 125b: second quarter-wave plate, 126a: first mirror, 126b: second mirror, 126: polarization plate, 127: moving unit, 128: second polarization switching unit, 130: magnifying mirror, 150: control unit, 160: drive mechanism, 210, 211: first optical path, 220, 221: second optical path, 300: windshield, 410: first virtual image, 411: first distance, 420: second virtual image, 421: second distance, 500: driver's eyes, 600: vehicle.

What is claimed is:

1. A virtual image display device comprising:
   a light source that emits a light beam;
   a polarization direction switch that switches a polarization direction of the light beam emitted from the light source between a first polarization direction and a second polarization direction;
   an image generator that generates image light from the light beam emitted from the light source;
   a first optical path through which the light beam having the first polarization direction travels;
   a second optical path through which the light beam having the second polarization direction travels, an optical path length of the second optical path being longer than an optical path length of the first optical path; and
   a light reflector that projects the light beam emerging from the first and second optical paths such that the projected light from the first optical path forms an image that is displayed as a virtual image at a first distance from an observer and the projected light from the second optical path forms an image that is displayed as another virtual image at a second distance farther than the first distance from the observer.

2. The virtual image display device according to claim 1, wherein:
   the light source is a laser light source and emits the light beam having the first polarization direction or the second polarization direction, and
   the polarization direction switch switches a light beam emitted therefrom between the light beam after changing the polarization direction of the light beam emitted from the light source unit by 90 degrees and the light beam without changing the polarization direction of the light beam emitted from the light source.

3. The virtual image display device according to claim 1, wherein the polarization direction switch is arranged between the light source unit and the first and second optical paths.

4. The virtual image display device according to claim 1, further comprising:
   a first polarized beam splitter that selectively transmits or reflects an incoming light beam according to a polarization direction of the incoming light beam,
   wherein one of a light beam that has been transmitted through the first polarized beam splitter and another light beam reflected by the first polarized beam splitter travels through the first optical path and the other travels through the second optical path.

5. The virtual image display device according to claim 4, further comprising:
   a first quarter-wave plate and a first mirror arranged on an optical axis of a reflected light beam which is the incoming light beam reflected by the first polarized beam splitter; and
   a second quarter-wave plate and a second mirror arranged on an opposite side across the first polarized beam splitter.

6. The virtual image display device according to claim 1, that is installed in a vehicle, the virtual image display device further comprising:
   a controller configured to acquire information on traveling speed of the vehicle from a traveling speed sensor provided in the vehicle and control the polarization direction switch on a basis of the information on the traveling speed.

7. The virtual image display device according to claim 1, that is installed in a vehicle, the virtual image display device further comprising a controller configured to acquire information on a current location of the vehicle from a navigation system provided in the vehicle and controls the polarization direction switch on a basis of the information on the current location.

8. The virtual image display device according to claim 1, that is installed in a vehicle, the virtual image display device further comprising
a controller configured to acquire information on an attention object in front of the vehicle from a forward monitoring system provided in the vehicle and control the polarization direction switch on a basis of the information on the attention object.

9. The virtual image display device according to claim 1, further comprising
a controller configured to control the light source, the image generator and the polarization direction switch so as to alternately display images at the first distance and at the second distance in a time-sharing manner.

10. The virtual image display device according to claim 1, wherein:
the polarization direction switch is configured to switch the polarization direction independently for each area, and
the virtual images are displayed simultaneously at the first distance and at the second distance with the light beam that has traveled through the first optical path of the optical path unit and the light beam that has traveled through the second optical path respectively.

11. The virtual image display device according to claim 1, wherein parts of the first and second optical path are moveable, thereby changing the optical path length of the first optical path or the second optical path, and thereby changing the distance from the observer to the virtual image.

12. The virtual image display device according to claim 1, wherein:
the image generator includes a scanner and a screen, and
the polarization direction switch is arranged between the scanner and the screen.

13. The virtual image display device according to claim 1, wherein:
the image generator includes a screen, and
the polarization direction switch is arranged on a light beam emitting side of the screen.

14. The virtual image display device according to claim 4, further comprising:
a second polarized beam splitter,
wherein the second polarized beam splitter transmits the light beam that has been transmitted through the first polarized beam splitter and reflects the another light beam reflected by the first polarized beam splitter.

* * * * *